March 22, 1966 L. T. SKEGGS ETAL 3,241,432

METHOD AND APPARATUS FOR SEQUENTIALLY PERFORMING ANALYSES ON A PLURALITY OF FLUID SAMPLES

Filed Oct. 31, 1962 11 Sheets-Sheet 1

INVENTORS
LEONARD T. SKEGGS
EDWIN C. WHITEHEAD
WILLIAM J. SMYTHE
JACK ISREELI
MILTON H. PELAVIN

BY Harry Cole
ATTORNEY

INVENTORS
LEONARD T. SKEGGS
EDWIN C. WHITEHEAD
WILLIAM J. SMYTHE
JACK ISREELI
MILTON H. PELAVIN
BY
ATTORNEY

INVENTORS
LEONARD T. SKEGGS
EDWIN C. WHITEHEAD
WILLIAM J. SMYTHE
JACK ISREELI
MILTON H. PELAVIN

BY [signature]
ATTORNEY

INVENTORS
LEONARD T. SKEGGS
EDWIN C. WHITEHEAD
WILLIAM J. SMYTHE
JACK ISREELI
MILTON H. PELAVIN
BY
ATTORNEY

INVENTORS
LEONARD T. SKEGGS
EDWIN C. WHITEHEAD
WILLIAM J. SMYTHE
JACK ISREELI
MILTON H. PELAVIN
BY
ATTORNEY

INVENTORS
LEONARD T. SKEGGS
EDWIN C. WHITEHEAD
WILLIAM J. SMYTHE
JACK ISREELI
MILTON H. PELAVIN
BY
[signature]
ATTORNEY INVENTORS
LEONARD T. SKEGGS
EDWIN C. WHITEHEAD
BY WILLIAM J. SMYTHE
JACK ISREELI
MILTON H. PELAVIN
ATTORNEY INVENTORS
Leonard T. Skeggs
Edwin C. Whitehead
William J. Smythe
Jack Isreeli
Milton H. Pelavin
BY
Attorney INVENTORS
LEONARD T. SKEGGS
EDWIN C. WHITEHEAD
WILLIAM J. SMYTHE
JACK ISREELI
MILTON H. PELAVIN
BY
Harry Cohen
ATTORNEY INVENTORS
LEONARD T. SKEGGS
EDWIN C. WHITEHEAD
WILLIAM J. SMYTHE
JACK ISREELI
MILTON H. PELAVIN
BY
ATTORNEY INVENTORS
LEONARD T. SKEGGS
EDWIN C. WHITEHEAD
WILLIAM J. SMYTHE
JACK ISREELI
MILTON H. PELAVIN
BY
ATTORNEY United States Patent Office 3,241,432
Patented Mar. 22, 1966

3,241,432

METHOD AND APPARATUS FOR SEQUENTIALLY PERFORMING ANALYSES ON A PLURALITY OF FLUID SAMPLES

Leonard T. Skeggs, Cleveland, Ohio, and Edwin C. Whitehead, Sloatsburg, William J. Smythe, Rye, Jack Isreeli, Tuckahoe, and Milton H. Pelavin, Greenburgh, N.Y., assignors to Technicon Instruments Corporation, Chauncey, N.Y., a corporation of New York Filed Oct. 31, 1962, Ser. No. 234,308
16 Claims. (Cl. 88—14)

This invention relates to the quantitative analysis of fluids with respect to one or more substances present in the fluids, and especially to a method and apparatus for quantitatively analyzing a series of individual fluid samples automatically, in succession, to determine the quantities of two or more substances present in each of the samples.

An object of the invention is to provide a method and apparatus of the indicated type in which the quantities of different substances present in the sample are determined by forming separate streams of the sample which are treated and analyzed with respect to different substances, and the results of the analysis are concomitantly recorded, in succession, on the chart of a recorder.

Another object is to provide a method and apparatus of the indicated type in which the flow of corresponding treated portions of the different streams is controlled in a manner which permits quantitative analysis of each stream, one after the other, according to a predetermined sequence, with respect to different substances present in the respective streams.

Another object is to provide a method and apparatus for multiple analysis in which the results of the analyses of a sample are recorded on a chart in a manner which directly indicates the concentrations of the different substances in the sample.

A further object is generally to provide an improved method and improved automatically operable apparatus for the quantitative analysis of one or more individual fluid samples with respect to a plurality of substances present in each sample, and which is especially useful for analyzing body fluids, for example blood or blood serum, with respect to a plurality of constituents thereof.

Another object is to provide apparatus particularly well adapted for use in connection with the analysis of body fluids of different patients and for providing the results of the analyses on a separate chart for each patient, automatically, and in a manner which assures rapid and accurate reading of the chart by the physician or nurse with a minimum time period between the abstraction of the sample from the patient and the recording of the results of the analyses.

The above and other objects, features and advantages of the invention will be more fully understood from the following description of the invention considered in connection with the accompanying drawings which are to be considered illustrative of the invention and not in limitation thereof.

Figure 1:
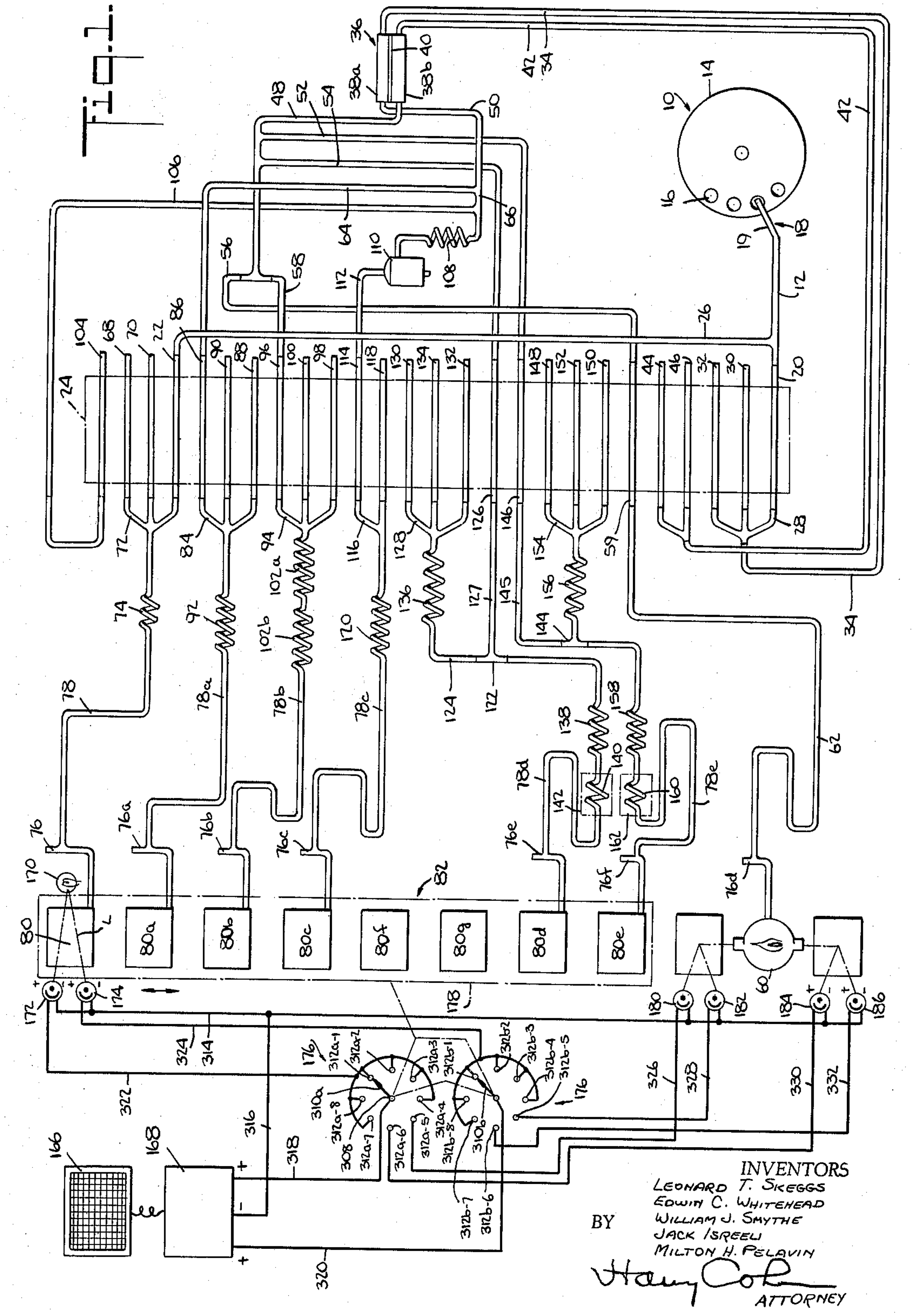
FIG. 1 is a more-or-less diagrammatic illustration of the method and apparatus of the present invention.

According to the invention, briefly described, a series of individual separate fluid samples are supplied, in succession, from a sample supply device and are formed into a sample or initial stream which is divided into two or more sample or quotient streams depending upon the number of substances with respect to which the samples are being analyzed. Each of the sample or quotient streams is separately treated for quantitative analysis with respect to a substance present in that stream and the resulting treated streams are transmitted to analyzing means. The flow of the individually treated streams through the analyzing means is controlled so that corresponding portions of each of the treated streams arrive at the analyzing means, in succession, whereby each of the treated streams is analyzed in succession and the results of the analyses are recorded, in succession, on the chart of a recorder or otherwise stored in correlation. The resulting record on the chart indicates the quantities of the different substances present in the sample.

According to one form of the invention, the analyzing means includes a colorimeter which comprises a series of individual flow cells, a pair of photoelectric detector cells, and a light source, which are mounted for relative movement with respect to each other to position the flow cells in succession, in the path of the light from the light source. Each of the treated streams is transmitted to a corresponding flow cell in a manner such that the color reacted portion of the stream flows through the flow cell during at least part of the period in which the flow cell is in position in the path of the light. The photoelectric cells operate a recorder and a record of the quantities of the different substances in the sample is provided on the chart of the recorder. The recorder has a movable stylus which is operated by a null-type current ratio balancing circuit which includes provision for varying the resistance of various components of the circuit, whereby the record of the analysis directly indicates the quantities of the different substances in the sample.

In accordance with a modification of the invention, a series of separate colorimeters, each provided with its own light source, flow cell and photoelectric detector cells, is provided in lieu of a single light source, a single pair of photoelectric cells and individual flow cells. The individually treated streams are transmitted to the corresponding flow cells of the corresponding colorimeters and the flow of the treated streams to the respective flow cells is controlled, as previously indicated. Means is provided for transmitting the responsive signals of each pair of photoelectric cells, in succession, to the recorder, whereby the quantities of the different substances in the sample are indicated, in succession, on the chart of the recorder.

The analyzing means may also include provision for the spectral-flame analysis of the sample with respect to certain substances therein, for example sodium or potassium or both, so the apparatus may include means for transmitting a stream containing a portion of the sample to a spectral-flame photometer for said analysis of the sample.

Referring now to the drawings in detail and first especially to FIG. 1, the apparatus comprises a sample supply device 10 for supplying a series of liquid samples, one after the other in succession, to a conduit 12 in the form of a stream of said samples consisting of the individual liquid samples longitudinally spaced from each other and separated from each other by an intervening air segment. The supply device is preferably of the type shown and described in U.S. Patent No. 3,038,340, issued June 12, 1962, and comprises a rotary sampled plate 14 having provision for holding a series of sample cups 16 arranged in a circular row. The cups are adapted to hold the different liquid samples such as, for example, specimens of blood or blood serum taken from different patients, each cup holding a blood specimen from a patient. The sample plate is operated intermittently by suitable mechanism to move each cup, in succession, into a take-off position at which a take-off device 18 is operable to move into the sample in the cup and withdraw a portion thereof and transmit it to conduit 12 for treatment and analysis thereof with respect to a plurality of substances therein, as for example in the present illustrative example of blood or blood serum; albumin, total protein, chlorides, carbon dioxide, sodium, potassium, glucose and blood-urea-nitrogen. Of course, it is to be understood that the present invention may be used for the determination of the quantities of any number of substances which are present in a fluid and which are capable of being analyzed.

Take-off device 18 includes a take-off tube 19 which is movable intermittently into and out of each cup when the cup is at the position of the take-off device. Conduit 12 is in fluid flow communication with aspirating pump tubes 20 and 22 of a proportioning pump 24, preferably of the type shown and described in U.S. Patent No. 2,935,028, issued May 3, 1960, so that the take-off device is operable to withdraw a predetermined portion of the sample from each cup, by aspiration, and between withdrawals of sample is operable to aspirate air into conduit 12 since the inlet end of take-off tube 19 is exposed to the atmosphere between withdrawals of sample, whereby each succeeding sample is separated from the other by an intervening air segment.

The air-segmented sample stream flowing in conduit 12 is treated, during its flow, for quantative analysis with respect to the above mentioned substances so that the sample can be analyzed both colorimetrically and by spectral-flame analysis. For these purposes, a portion of the sample stream flowing in conduit 12 is transmitted, as a separate stream, through conduit 26, by the action of pump tube 22, while the remaining portion of the sample stream is transmitted to a fitting 28, by the action of pump tube 20, where it joins an air inert gas stream simultaneously transmitted through pump tube 30 and a liquid stream containing acidified lithium nitrate simultaneously transmitted through pump tube 32. The function of the acidified lithium nitrate is to provide an internal standard for that portion of the sample which is to undergo spectral-flame analysis. The function of the air is to segmentize each liquid sample so that it is divided into a series of longitudinally spaced liquid segments separated from each other by an intervening air segment. As explained in U.S. Patent No. 2,797,149, issued June 25, 1957, the air segments help maintain the walls of the tubular passages of the apparatus clean and prevent contamination of one sample by a preceding sample. It is to be understood that it is within the scope of the invention to use an immiscible and separable cleansing liquid, as described in U.S. Patent 3,047,367, issued July 31, 1962, in lieu of the segmentizing air or other inert gas.

The segmented liquid stream of separate individual liquid segments, each containing a portion of the sample and a portion of the lithium nitrate, is transmitted through conduit 34 to one side of a dialyzer 36, preferably of the type shown and described in U.S. Patent No. Re. 24,736, issued November 17, 1959, which, briefly described, comprises a pair of dialyzer plates **38*a* and 38*b* separated from each other by a dialyzer membrane 40. The dialyzer functions to separate a portion of the diffusible substances in the sample from the non-diffusible substances in the sample. Each of the dialyzer plates has a passage which is in confronting relation with the passage of the other plate and the sample stream is transmitted through the passage of plate 38*a* while a recipient stream is concurrently transmitted through a conduit 42 and through the passage in dialyzer plate 38*b*. The recipient stream is on air-segmented liquid stream of water. The liquid is introduced through pump tube 44 and the segmentizing air is simultaneously introduced through pump tube 46**. The dialyzer is immersed in a suitable temperature controlled bath and is provided with mixing coils at both its inlet ends to mix the constituents of the liquid segments of the sample and recipient streams, as described in U.S. Patent No. 3,028,965, issued April 10, 1962.

A portion of the crystalloid substances in the sample stream transmitted to the sample side of the dialyzer, i.e. blood-urea-nitrogen, glucose, sodium, potassium and chlorides, as well as a portion of the previously introduced lithium nitrate, pass through membrane 40 into the recipient stream flowing through the recipient side of the dialyzer and the resulting stream flows from the dialyzer through a conduit 48. The sample stream containing the colloidal substances as well as the remaining portions of the crystalloid substances flows from the sample side of the dialyzer through a conduit 50 and each of the separate streams from the dialyzer is treated for analysis as will now be described.

The stream flowing in conduit 48 is divided, in the manner shown, into four separate streams which concurrently and separately flow through conduits 52, 54, 56 and 58, respectively. The stream flowing in conduit 52 is treated for quantitative colorimetric analysis with respect to its blood-urea-nitrogen content. The stream flowing in conduit 54 is treated for quantitative colorimetric analysis with respect to its glucose content. The stream flowing in conduit 56 and which contains a portion of the lithium nitrate internal standard is not treated any further and is introduced, by the action of pump tube 59, into the flame of a spectral-flame photometer 60, via conduit 62, to determine its sodium and potassium content. The stream flowing in conduit 58 is treated for quantitative colorimetric analysis with respect to its chloride content. The stream from the sample side of the dialyzer is divided into two separate streams, in the manner shown, which are also treated for quantitative analysis. More particularly, the stream flowing in conduit 64 is treated for colorimetric quantitative analysis with respect to its total protein content, and the stream flowing in conduit 66 is treated for quantitative colorimetric analysis with respect to its carbon dioxide content.

The previously mentioned portion of the sample stream flowing in conduit 26, and which does not contain the lithium nitrate internal standard, is treated for quantitative colorimetric analysis with respect to its albumin content, it being understood that the lithium nitrate, if present in the sample, would have adverse effects on the colorimetric treatment of the sample with respect to albumin. To avoid this, the sample stream for albumin determinations is formed prior to the introduction of the lithium nitrate, in the manner described above.

As illustrated herein with respect to the above-mentioned constituents of the blood or blood serum samples, seven separate streams are concurrently formed, each containing a portion of the sample, and each stream is separately treated, if required, for analysis with respect to a different substance or substances present in the corresponding stream. In the case of the spectral-flame analysis of one or more of the streams, it is to be understood that no further treatment is necessary since such stream or streams have been previously treated so that they contain an internal standard. The remaining streams whose consituents are to be determined colorimetrically are separately treated for colorimetric analysis with respect to different substances, respectively, and in general, this requires the introduction into each of the streams, one or more color-producing reagents depending upon the particular colorimetric treatment required with respect to that particular substance.

Figure 4:
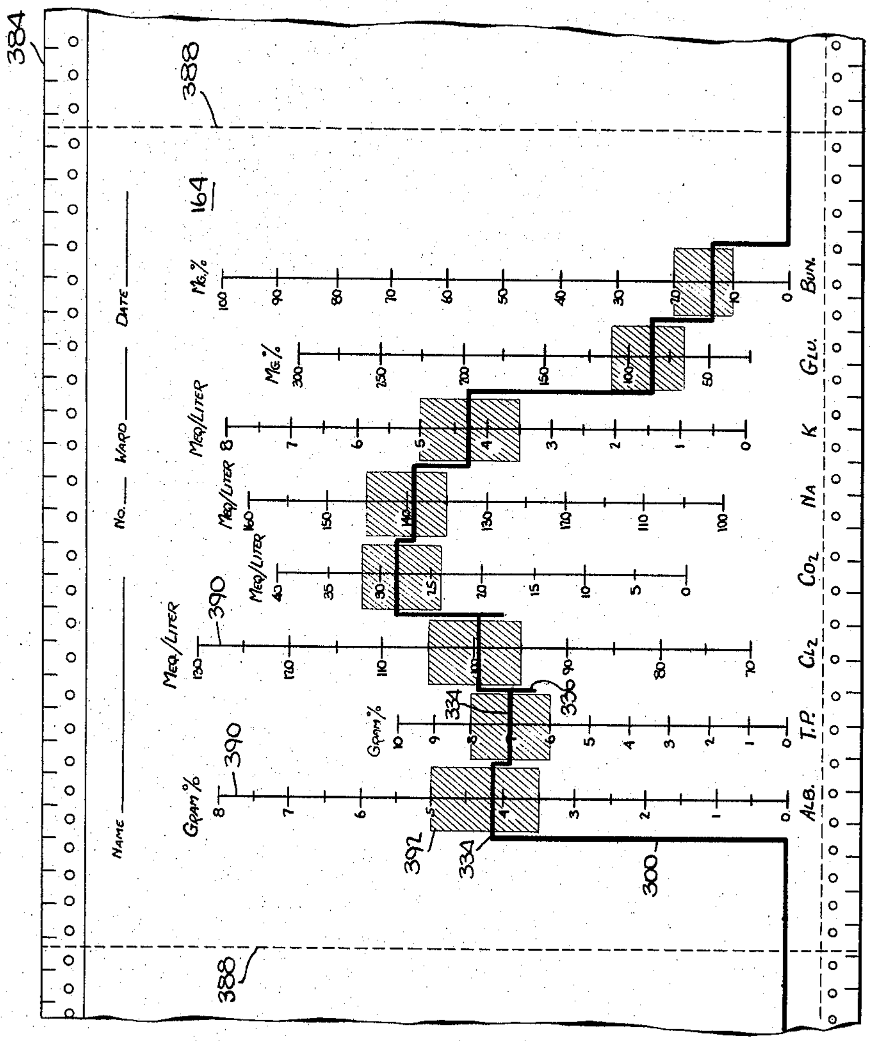
FIG. 4 illustrates a portion of the chart paper of the recorder and a record of the analysis of an individual sample with respect to a plurality of substances present in the sample.

As herein illustrated, the apparatus is arranged to provide a record, as illustrated by FIG. 4, of the concentrations of the above mentioned substances in blood or blood serum in the following order: albumin, total protein, chloride, carbon dioxide, sodium, potassium, glucose and blood-urea-nitrogen. The sample stream flowing in conduit 26 and pump tube 22, respectively, is treated colorimetrically to determine its albumin content by introducing a suitable color-producing reagent through pump tube 68, and a suitable segmentizing fluid is simultaneously introduced through pump tube 70. The different fluids join each other at fitting 72 to form a segmented stream which is transmitted to the horizontal helical mixing coil 74 for mixing together the various constituents of each liquid segment in its respective liquid segment. The resulting stream is transmitted from mixing coil 74 to a debubbler 76, via conduit 78, which is operative to remove the segmentizing air or other inert gas from the stream before the liquid is introduced into the flow cell 80 of the colorimeter 82, so that a consolidated liquid stream, without any segmentizing fluid, is transmitted through the flow cell of the colorimeter.

To determine the total protein content of the sample, the stream flowing in conduit 64 is treated for colorimetric quantitative analysis with respect to its total protein content by transmitting the stream to a fitting 84, through the action of pump tube 86, where it joins a stream of a suitable color-producing reagent and a segmentizing fluid simultaneously introduced through pump tubes 88 and 90, respectively. The resulting stream from fitting 84 is transmitted to another horizontal helical mixing coil 92 and from the latter, via conduit **78*a*, to the debubbler 76*a* for removal of the segmentizing fluid, and the resulting consolidated liquid stream is introduced into the flow cell 80*a* of the colorimeter 82** for colorimetric examination.

The chloride content of the sample is determined by treating the stream flowing in conduit 58 for colorimetric analysis with respect to its choride content and this is accomplished by transmitting the stream to a fitting 94, through the action of pump tube 96, where it joins a stream of a suitable color-producing reagent and a stream of a segmentizing fluid simultaneously introduced through pump tubes 98 and 100, respectively. The resulting segmented stream is mixed in horizontal helical mixing coils **102*a* and 102*b*, respectively, and the resulting mixed stream is transmitted to the debubbler 76*b*, via conduit 78*b*, for removal of the segmentizing fluid so that a consolidated liquid stream is transmitted to flow cell 80*b*** for colorimetric examination with respect to its chloride content.

For determining the carbon dioxide content of the sample, the stream flowing in conduit 66 is treated for colorimetric analysis with respect to its carbon dioxide content and in this regard it is to be noted that the acid content of the acidified lithium nitrate previously introduced into the stream flowing in conduit 66 is operable to release the carbon dioxide content from the stream so that the carbon dioxide is in gaseous form. A suitable anti-foam reagent is introduced into the stream flowing in conduit 66 via pump tube 104 and conduit 106, respectively, and the resulting stream is transmitted to a horizontal helical mixing coil 108 and from the latter to a gas-liquid separator 110, preferably of the type shown in U.S. Patent No. 2,967,764, issued January 10, 1961. In the separator, the carbon dioxide gas content of the stream is separated from the liquid of the stream and is transmitted, as a separate stream, from the separator through conduit 112, by the action of pump tube 114, to a fitting 116 where it joins a suitable color-producing reagent introduced through pump tube 118. The resulting stream is transmitted from the fitting to a horizontal helical mixing coil 120 and from the latter to debubbler **76*c*, via conduit 78*c*, which removes any remaining carbon dioxide from the stream so that a consolidated liquid stream is introduced into the flow cell 80*c*** for the colorimetric examination of the stream.

To determine the sodium and potassium content of the sample, the stream flowing through conduit 56 and which contains a portion of the lithium nitrate internal standard, is introduced, via pump tube 59 and conduit 62, respectively, into the flame of the burner of the spectral-flame photometer 60 which is preferably of the type shown described in the U.S. patent application of Jack Isreeli, Serial No. 837,401, filed September 1, 1959, now Patent No. 3,137,759, granted June 16, 1964, and which has provision for simultaneously examining the liquid stream with respect to both its sodium and potassium content. A debubbler **76*d*** is provided for removing the segmentizing fluid of the stream so that a consolidated liquid stream is introduced into the flame of the burner.

To determine the glucose content of the sample, a segmentized color-producing reagent stream is transmitted to a fitting 122, via conduit 124, where it joins the stream from conduit 54 which is transmitted to the fitting through the action of pump tube 126, via conduit 127. The segmentized color-producing reagent stream is formed by transmitting suitable color-producing reagents to a fitting 128 through pump tubes 130 and 132, respectively, where the reagents join a suitable segmentizing fluid simultaneously transmitted through pump tube 134. The resulting stream is mixed in horizontal helical mixing coil 136 and is transmitted therefrom to conduit 124 and fitting 122. From fitting 122, the resulting stream is transmitted to horizontal helical mixing coil 138 and therefrom through a coil 140 immersed in a heating bath 142 which assists in completing the color reaction. The stream is transmitted from the heating bath, via conduit **78*d*, to a debubbler 76*e* which removes the segmentizing fluid and a consolidated liquid stream is transmitted to the flow cell 80*d*** of the colorimeter for colorimetric examination of the liquid with respect to its glucose content.

To determine the blood-urea-nitrogen content of the sample, the stream flowing in conduit 52 is transmitted to a fitting 144, via conduit 145, and by the action of pump tube 146, where it joins a segmentized color-producing reagent stream formed by introducing suitable color producing reagents into pump tubes 148 and 150, respectively. The segmentizing fluid for the stream is simultaneously introduced into pump tube 152. The fluids join each other at fitting 154 and the constituents of the liquid segments of each stream are mixed together in their respective segments in horizontal helical mixing coil 156. The resulting stream is transmitted from fitting 144 to a horizontal helical mixing coil 158 and from the latter to a coil 160 which is immersed in a heating bath 162 which aids in completing the color reaction. The resulting liquid is transmitted from the bath, via conduit **78*e*, to the debubbler 76*f* for removal of the segmentizing fluid from the stream, and the resulting consolidated liquid stream is transmitted to the flow cell 80*e*** of the colorimeter for colorimetric examination with respect to its blood-urea-nitrogen content.

As indicated previously, and as illustrated by FIG. 4, the results of each analysis of the separate streams with respect to the different substances therein are recorded, in succession, on the chart 164 of the recorder 166. For this purpose the results of each separate analysis are transmitted, in succession, to the measuring and operating electric circuit 168 of the recorder for operation thereof. In addition, the flow of each of the individually treated streams is controlled so that at least a portion of the fully colored liquid is flowing through the flow cell of the colorimeter at the time the stream is being colorimetrically analyzed, since the streams are individually and separately examined by the colorimeter, one after the other, in succession. With respect to the spectral-flame analysis of one of the streams with respect to one or more substances present therein, the responses of the spectral-flame photometer is transmitted to the recorder control circuit 168 in sequential relation with respect to the responses of the colorimeter, so that the flow of the stream introduced into the flame of the burner must also be controlled in order that a portion of the sample is undergoing spectral-flame analysis when the apparatus is in position to receive signals from the spectral-flame photometer. In other words, the flow of the individual streams to their respective flow cells or spectral-flame photometer must be in phase relation with respect to each other so that a portion of the sample of each stream is undergoing colorimetric or spectral-flame analysis when the recorder is in position for recording the results of that analysis.

The proper phasing of the streams is accomplished by varying the lengths of flow paths of each of the individual streams so that the treated sample portion of the first stream which is to undergo analysis with respect to a substance therein arrives at its respective flow cell or spectral-flame photometer first and at the same time that the recorder is in position for receiving signals resulting from the examination of that stream. The lengths of flow paths of the remaining streams are each increased different amounts so that a portion of the same sample of each stream arrives at its respective flow cell or spectral-flame photometer at the proper time. Thus it is seen, as diagrammatically illustrated by FIG. 1, that the stream which is introduced into flow cell 80 has the shortest flow path 78 for the colorimetric examination of that stream first with respect to its albumin content. The stream which is introduced into flow cell **80*a* has a slighly longer flow path 78*a* for colorimetric examination of that stream next with respect to its total protein content. The stream which is introduced into flow cell 80*b* has a flow path 78*b* which is longer than the flow path 78*a* of the stream which is introduced into flow cell 80*a*. Similarly, the stream which is introduced into flow cell 80*c* has a flow path 78*c* which is longer than the flow path 78*b* of the stream which is introduced into flow cell 80*b*. The stream which is introduced into the spectral-flame photometer 60 and which is fifth in position for examination, has a flow path 62 which is longer than flow path 78*c* of the stream which is introduced into flow cell 80*c* and which is fourth to undergo examination. The streams which are introduced into flow cells 80*d* and 80*e*, respectively, have flow paths 78*d* and 78*e*, respectively, which are sufficiently long with respect to the flow paths of the other streams so that said streams are examined, in succession, and in sequence 7 and 8**, respectively.

The above described phasing of the streams was accomplished with tubes 78, **78*a*, 78*b*, 78*c*, 78*d*, 78*e* and 62** having internal diameters of sufficient sizes to accommodate the quantities of fluids flowing through the respective tubes at the same linear rates of flow. As explained in the above-mentioned U.S. Patent No. 2,797,-149, the necessary quantities of processing liquids and color-producing reagents for the different reactions are automatically provided by selecting pump tubes of the proper internal diameters and the different quantities of fluids are automatically brought together for the different reactions. No measuring is required since the pump tubes automatically provide the correct relative proportions of fluids for treatment of the different sample streams with respect to the different substances.

It will be understood that the proportioning pump propels the liquids and fluids through the respective pump tubes by a series of pressure rollers which engage and collapse the tubes along lines transversely of the tubes and which move longitudinally of the tubes. Different pump rates are provided between the pump tubes by varying the internal diameters of the pump tubes which are resiliently flexible so that they can be easily compressed and collapsed by the pumping rollers.

Colorimeter 82, which will be described in detail hereinafter, includes a light source 170 and a pair of photoelectric detector cells 172 and 174, respectively, which as herein shown are photovoltaic cells so that a separate voltage source is not needed for operation of the cells, although it will be understood that it is within the scope of the invention to provide photoconducting cells and a power source therefor, if desired or required. The cells are electrically connected and disconnected from the measuring and operating circuit 168 of the recorder 166 by means of a drum-type selector switch 176, and circuit 168 includes a null-type current ratio balancing circuit for operating the stylus of the recorder as will be fully described hereinafter. Cell 172 is adapted to be connected or disconnected to the reference side of the balancing circuit while 174 is adapted to be connected or disconnected to the sample side of the balancing circuit. Cell 172 is in position to receive light from the light source 170 which passes through a reference having 100% light transmittance characteristics, and cell 174 is adapted to simultaneously receive light from the light source and which has passed through the color-reacted sample that flows through the flow cell.

The flow cells of the colorimeter are mounted on a carriage 178 which is movable, by suitable mechanism hereinafter described, intermittently and rectilinearly back and forth in a direction which is transversely of light beam L which is transmitted to the sample photoelectric cell 174, so that the flow cells are positioned in the path of light beam L, in succession, and each flow cell remains in the path of the light for a predetermined period of time for colorimetric examination of the treated stream which is concurrently passing through the respective flow cell. The tubular passages transmitting the fluids to and from the colorimeter are flexible so as not to interfere with the flow cell positioning movement of the carriage. The responses of the detectors 172 and 174 are simultaneously transmitted to circuit 168 which operates the stylus of the recorder to provide a record of the concentration of the substance for which the stream passing through the respective flow cell is being analyzed.

The spectral-flame photometer 60 is provided with two pairs of photoelectric cells. Cells 180 and 182 are the reference and sample cells, respectively, for providing responses indicative of the concentration of sodium in the sample, and cells 184 and 186 are the reference and sample cells, respectively, for providing responses indicative of the concentration of potassium in the sample.

It is to be noted that the colorimeter 82 is also provided with additional flow cells **80*f* and 80*g*** which, in the present illustration of the invention is not utilized, but it will be understood, as indicated above, that the colorimeter can be provided with any number of flow cells as necessary for determining a plurality of substances present in a fluid sample, and all the flow cells of the colorimeter need not be used during the examination of a fluid with respect to substances present therein.

The mechanism and electrical control for the timed movement of the colorimeter carriage to position the flow cells, in succession, for predetermined periods of time in the path of the light beam L will now be described with particular reference to FIG. 2. The colorimeter carriage 178 is operated by a double-shaded-pole reversing motor 188 which is under the control of a timer 190. The motor drives a Geneva gear mechanism 192 having a driver member 194 and a driven member 196 which operates a gear 198 that drives a rack 200 which is secured to the carriage. During one cycle of operation, the carriage is operated and each flow cell is moved into light viewing position, one after the other, by intermittent rectilinear movement of the carriage in one direction, and each flow cell remains in the light viewing position for a predetermined period of time. After the last flow cell, that is flow cell 80*e*, has remained in its light viewing position for the required period of time, the carriage moves slightly in the same cell positioning direction to engage normally open switch 202 and upon closing of the switch, the direction of motor 188 is reversed and the carriage moves in an opposite direction until it engages normally closed switch 204, whereupon opening of said switch reverses the movement of the carriage. Movement of the carriage closes switch 204 and motor 188 stops, so that the carriage and flow cells are again in position for repetition of the cycle.

Figure 2:
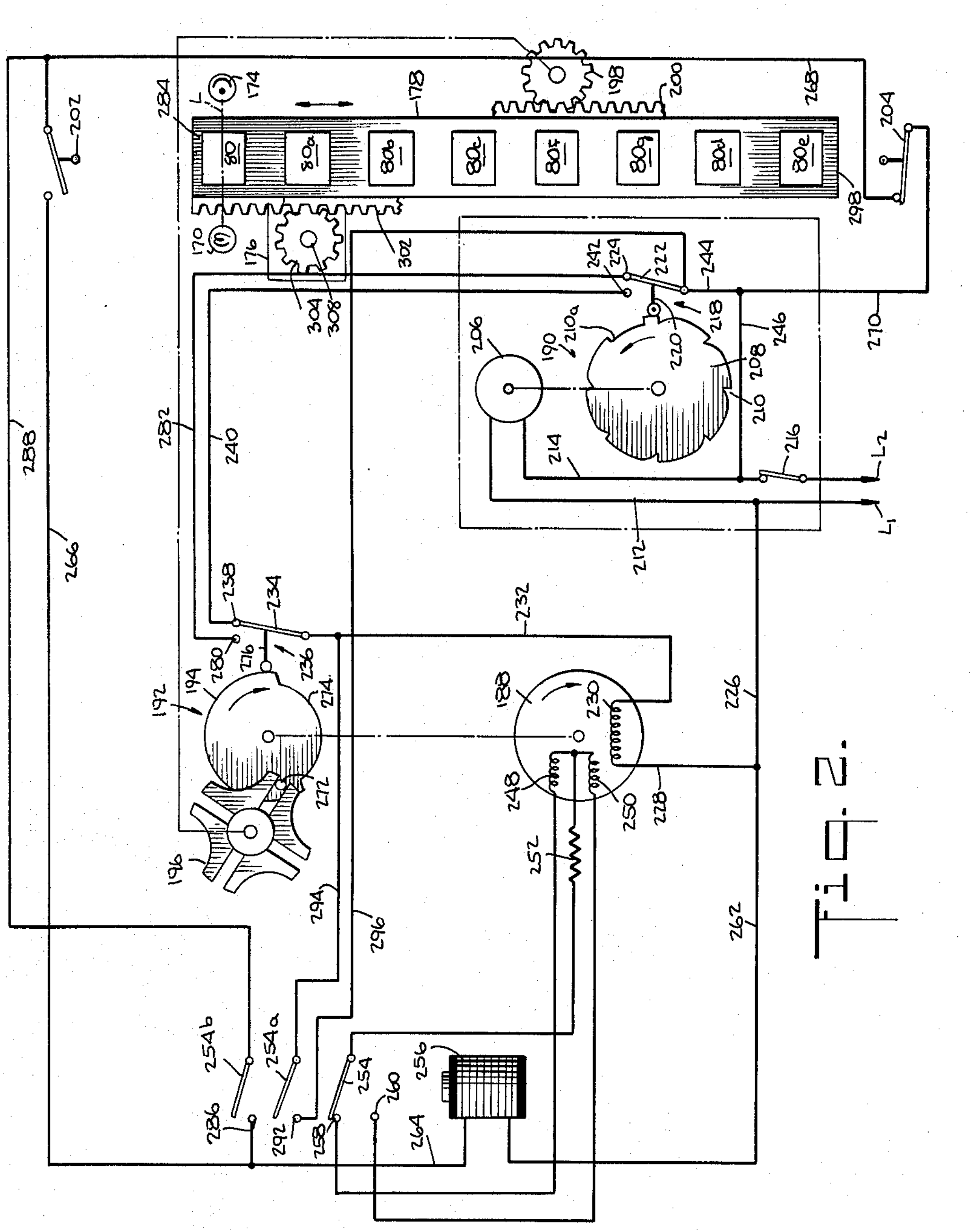
FIG. 2 is a wiring diagram of the controls of the apparatus.

As illustrated in FIG. 2, the apparatus is in the position in which flow cell 80 is at the light viewing position and is near the end of the period of examination of the stream flowing through said flow cell. The timer 190 includes a timer motor 206 which drives a timer disk 208 having a series of cutouts 210 equally spaced along the peripheral edge of the disk, and it is to be noted that eight cutouts are provided corresponding to the number of flow cells on the carriage of the colorimeter. Power is supplied to the timer motor from lines $L_1$ and $L_2$ through leads 212 and 214, respectively, and a switch 216, shown closed, is provided in line $L_2$ for starting and stopping the operation of the apparatus. As taught in the above mentioned U.S. Patent No. 3,038,340, this switch can be operated automatically by the sample supply device 10 so that the apparatus automatically stops after a predetermined number of operating cycles. The timer disk operates a timer switch 218 which has an operating arm 220 that rides on the peripheral edge of the timer disk. In the position shown, the arm is on the edge of the disk between cutouts 210 so that movable contact 222 of the switch engages stationary contact 224 of the switch whereby the energization circuit for motor 188 is open and the motor is de-energized. The energization circuit for the motor can be traced as follows: line $L_1$, lead 226, lead 228, stator winding 230 of the motor, lead 232, movable contact 234 of motor control switch 236, stationary contact 238 of the motor control switch, lead 240, timer switch 218 which is open at its stationary contact 242, lead 244 and 246, respectively, and line $L_2$.

Continued rotation of the timer disk 208 results in engagement of operating arm 220 of timer switch 218 with the next cutout 210 of the timer disk whereby movable contact 222 of the timer switch engages stationary contact 242 of the switch to complete the energization circuit to motor 188 which rotates clockwise, as shown, for moving the carriage in a direction toward switch 202 to position the next succeeding flow cell, namely flow cell 80*a*, in position at the light viewing station. The motor is provided with two separate field circuits which control the direction of its rotation. Motor field coil 248, when energized by stator winding 230 through induction, provides clockwise rotation of the motor, as shown, and motor field coil 250 provides counterclockwise rotation of the motor when energized by stator coil 230. The field coils are connemted in separate circuits, as shown, through a common resistor 252. The resistor is connected to the movable contact 254 of a normally de-energized relay 246, and in the de-energized condition of the relay, movable contact 254 engages stationary contact 258 to complete a circuit through field coil 248, so that the motor rotates in a clockwise direction when the circuit through stator coil 230 is completed. In the energized condition of the relay, movable contact 254 engages stationary contact 260 whereby a circuit through field coil 250 is completed so that the motor rotates in a counterclockwise direction when stator coil 230 is energized. The energization circuit for relay 256 includes switches 202 and 204 and since switch 202 is open, the relay is de-energized. The energization circuit for the relay can be traced as follows: line $L_1$, lead 226, lead 262, the coil of relay 256, lead 264, lead 266, switch 202, lead 268, switch 204, lead 270, lead 246, closed switch 216 and line $L_2$.

Rotation of motor 188 operates the Geneva driver member 194 so that its driver pin 272 operates the driven member 196 to move the carriage and position flow cell 80*a* at the light examining station. The rim of member 194 is provided, as shown herein, with a cutout 274 for operating arm 276 of motor control switch 236 which moves into position in cutout 274 and thereby moves the movable contact 234 of the switch so that it disengages stationary contact 238 and engages stationary contact 280 of the switch. The motor still remains energized, however, because timer disk 208 has rotated a sufficient amount whereby the operating arm 220 of the timer switch 218 moves out of cutout 210 onto the rim of the disk so that the movable contact 222 of the switch engages contact 224, whereby the energization circuit to the motor continues, now through closed contacts 280, lead 282 and closed contact 224. The carriage remains stationary of course during this latter rotation of the motor, since the Geneva driver pin 272 is no longer in engagement with one of the slots of the Geneva driven member 196. Continued rotation of the motor causes the operating arm 276 of the motor control switch to move out of cutout 274 and thereby contact 280 is disengaged and contact 238 is engaged, and the energization circuit to the motor is broken and the motor stops. It will be energized again when the timer disk moves into position so that the operating arm of the timer switch 218 again engages a cutout 210 of the timer disk, for commencing a succeeding indexing movement of the carriage. Of course, Geneva member 194 need not be provided with the cam cutout 274 since the operation of switch 236 may also be controlled by a separate cam mounted on the shaft of member 194.

The foregoing described movements of the carriage and operation of the timer, motor and motor control switch, under the control of the Geneva driver member 194, continues until the timer disk moves into position, at the conclusion of the examining period for flow cell 80*e*, wherein cutout 210*a* is in position for engagement thereof by the operating arm 220 of the timer switch to commence movement of the carriage toward switch 202. In this position, the end 284 of the carriage is close to the operating arm of switch 202 so that a small movement of the carriage engages said switch to complete an energization circuit to relay 256 for commencing the reverse and return movement of the carriage. The energization circuit for the relay is completed through now closed switch 202 and normally closed switch 204, as previously described. Energization of the relay results in the operation of relay movable contacts 254, 254*a* and 254*b*. Movement of contact 254 results in engagement thereof with stationary contact 260 to complete the circuit through the reversing field coil 250 of the motor, whereby the motor reverses its direction of rotation so that it rotates in a counterclockwise direction and carriage 178 moves in an opposite direction away from switch 202 and toward switch 204. Movement of movable contact 254b of the relay results in engagement thereof with stationary contact 286 of the relay which results in completion of a holding circuit for the relay which can be traced as follows: line $L_1$, leads 226 and 262, the coil of relay 256, lead 264, contacts 286 and 254b of the relay, leads 288 and 268, closed switch 204, leads 270 and 246, closed switch 216 and line $L_2$. The holding circuit is necessary for maintaining relay energized since reverse movement of the carriage results in the opening of switch 202 which would normally de-energize the relay.

Operation of contact 254a of the relay results in the engagement thereof with stationary contact 292 of the relay which completes a circuit that bypasses motor control switch 236 and timer switch 218 during the reverse movement of the carriage, so that the motor operates continuously, without interruption, to return the carriage back to its initial position for commencement of another operating cycle. The energization circuit for the motor during reversed movement of the carriage can be traced as follows: line $L_1$, leads 226 and 228, stator coil 230, leads 232 and 294, now closed contacts 254a and 292, leads 296, 244 and 246, closed switch 216 and line $L_2$.

The return movement of the carriage continues until end 298 of the carriage engages switch 204 which results in the de-energization of relay 256. De-energization of the relay results in the movement of the movable contacts 254, 254a and 254b of the relay back to the position shown in FIG. 2. This results in the reversal of motor 188 and the carriage again moves toward switch 202 and away from switch 204, it being understood that the operating arm 220 of the timer switch 218 is still in the cutout 210a of the timer disk so that the circuit to the motor is completed through closed contacts 222 and 242 of the timer switch and closed contacts 234 and 238 of the motor control switch 236. The movement of the carriage continues until the operating arm 276 of the motor control switch moves into cutout 210a to de-energize the motor due to the opening of contacts 234 and 238. The timer disk continues to rotate and arm 220 of the timer switch moves out of cutout 210a to complete an energization circuit to the motor through closed contacts 222 and 224 of the timer switch and closed contacts 234 and 280 of the motor control switch. The motor rotates until arm 276 moves out of cutout 274 to open the motor energization circuit at contact 280 and the motor stops. The apparatus has now completed one cycle of operation and is in position for a repetition of the cycle.

Figures 6, 8:
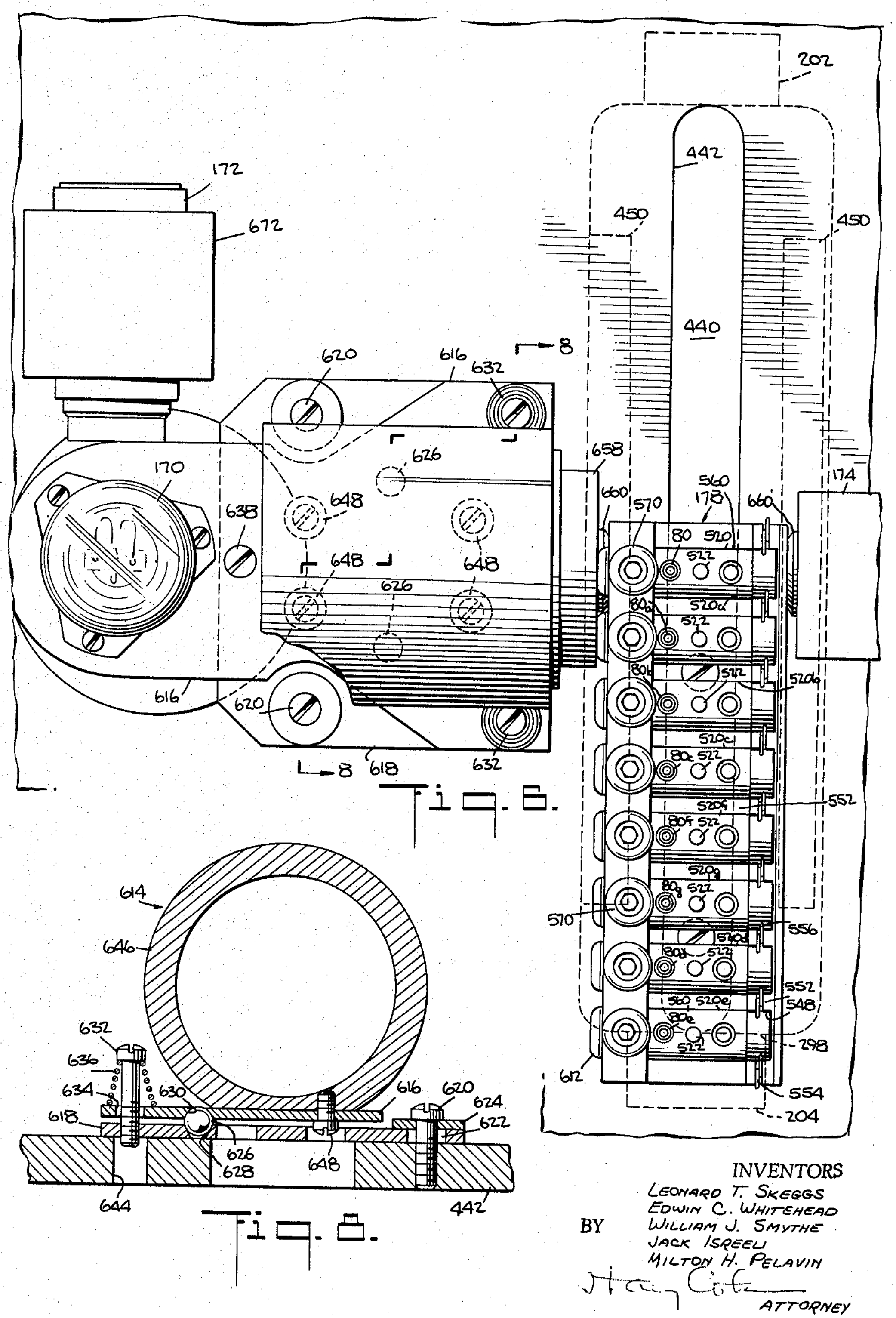
FIG. 6 is a top plan view of part of a colorimeter in accordance with the present invention.
FIG. 8 is a vertical sectional view taken on line 8—8 of FIG. 6.

It will be understood that switch 202 is illustrated diagrammatically in FIG. 2 and is shown close to the end 284 of carriage 178 because of space limitations, but in actual practice the switches are arranged as shown in FIG. 6 with switch 202 in position to be engaged by end 284 of the carriage during movement thereof after the period of examination of the liquid which flows through cell 80e.

As previously indicated, the function of selector switch 176 is to transmit the signals from the photoelectric cells 172, 174, 180, 182, 184 and 186 in the proper sequence and to change the various electrical characteristics of the recorder control circuit 168 so that the record 300 (FIG. 4) traced on the chart 164 of recorder 166 directly indicates the concentrations of the different substances in the sample. As indicated in FIG. 2, the operation of selective switch 176 is controlled by intermittent cell positioning movement of the carriage 178 of the colorimeter 82. More particularly, a rack 302 is secured to the carriage and operates a meshing gear 304, and the gear is connected to the rotary shaft 308 of the selector switch. In this manner, shaft 308 is rotated intermittently and concurrently with the cell positioning movement of the carriage.

Figure 3:
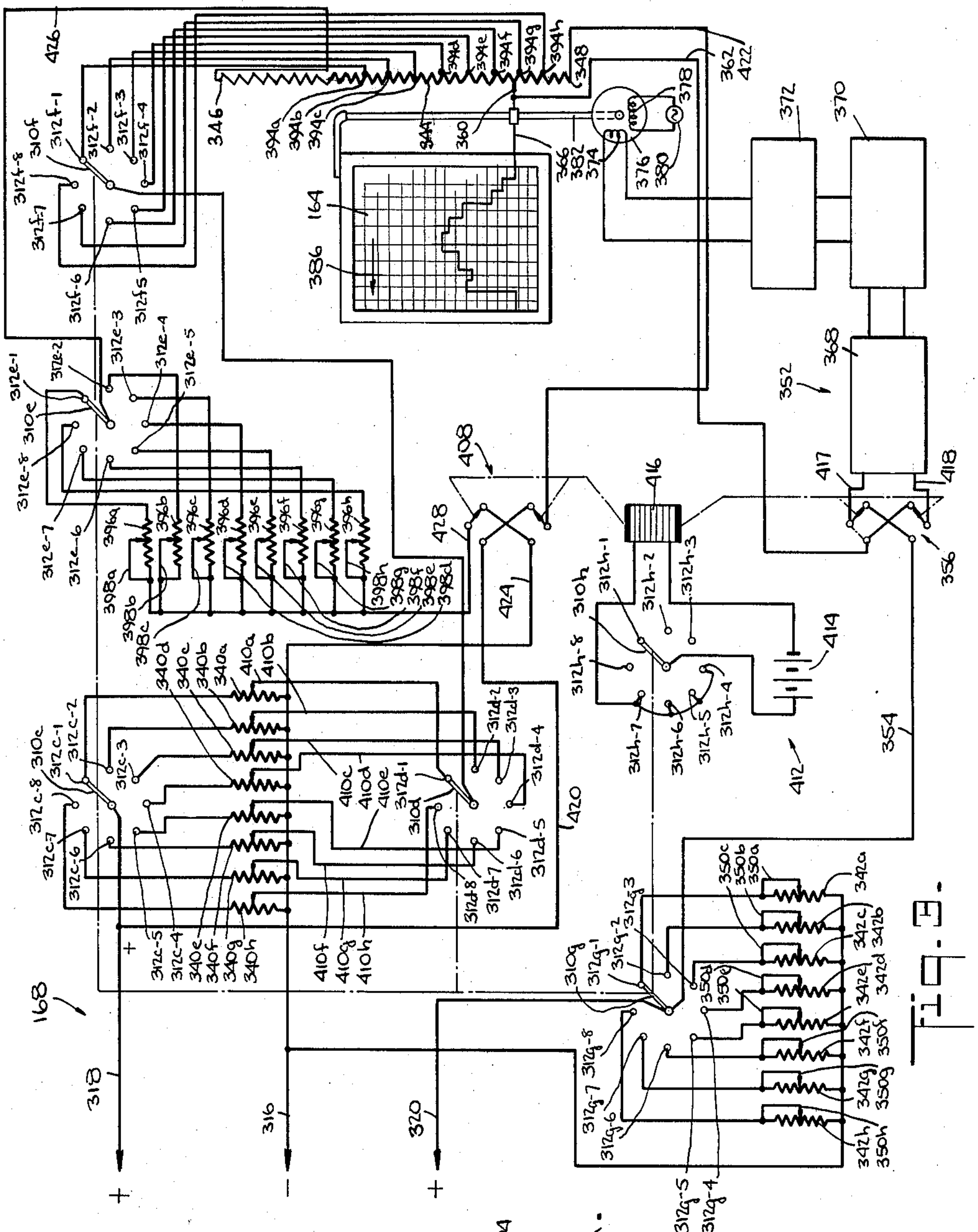
FIG. 3 is a wiring diagram of the measuring and operating circuit of the recorder of the apparatus.

Referring now to FIGS. 1 and 3, the selector switch has a series of separate movable contacts designated respectively, 310a, 310b, 310c, 310d, 310e, 310f, 310g and 310h, all of which are mounted on shaft 308 of the switch and are movable in unison. Each of the movable arms of the selector switch is adapted to engage companion stationary contacts consisting of eight contacts for each movable arm of the switch, and the stationary contacts correspond in number to the number of flow cells provided in the colorimeter. The companion stationary contacts for movable contact 310a are designated 312a–1, 312a–2, 312a–3, 312a–4, 312a–5, 312a–6, 312a–7 and 312a–8, it being understood that the last numeral represents the position of the stationary contact for said series of stationary contacts. The companion stationary contacts for the other movable contacts of the selector switch are indentified similarly, as shown.

The function of movable contacts 310a and 310b is to transmit the responses of the photoelectric cells in proper sequence to the recorder control circuit 168. More particularly, in order to provide the record of the concentrations of the different substances in the sample in the sequence shown on chart 164 of FIG. 4, it is necessary that the streams be examined in the sequential order previously indicated, as provided by proper phasing, and the responses of the photoelectric cells must also be transmitted to the control circuit in the same sequence. This is accomplished by movable contacts 310a and 310b of the selector switch 176.

Referring to FIG. 1, each photoelectric cell has a positive side and a negative side, and the negative sides of the cells are connected to the negative input side of circuit 168 via leads 314 and 316, respectively. The positive sides of the reference cells 172, 180 and 184 are connected in sequence to the positive input lead 318 of circuit 168 through movable contact 310a and its associated stationary contacts of the selector switch, and the positive sides of the sample cells 174, 182 and 186 are connected to the positive input sides 320 of circuit 168, in proper sequence, through movable contact 310b and its associated stationary contacts of the selector switch. As shown in FIG. 1, the carriage 178 of colorimeter 82 is in position so that the stream passing through flow cell 80 is undergoing colorimetric analysis and the responses of photoelectric cells 172 and 174 are being transmitted to circuit 168. The response of cell 172 is transmitted to circuit 168 through lead 322, stationary contact 312a–1, movable contact 310a and lead 318. The response of cell 174 is transmitted to circuit 168 via lead 324, stationary contact 312b–1, movable contact 310b and lead 320. Circuit 168 operates the recorder so that the stylus of the recorder scribes that part of record 300 (FIG. 4) indicating the concentration of albumin in the sample.

The carriage is operated, in the manner previously described, to position flow cell 80a at the light examining station and the responses of cells 172 and 174 are transmitted to circuit 168 via stationary contacts 312a–2 and 312b–2 of the selector switch, since the movable contacts 310a and 310b of the switch have been moved, by the operation of the carriage, whereby they engage stationary contacts 312a–2 and 312b–2, respectively. The operation of the recorder now results in scribing that portion of record 300 which indicates the concentration of total protein in the sample.

The apparatus is operated in a similar manner with respect to flow cells 80b and 80c for scribing those portions of record 300 which represent the chloride and carbon dioxide content, respectively, of the sample.

The next substance whose concentration is to be recorded is sodium and it will be recalled that the sodium content of the sample is determined by spectral-flame analysis and photoelectric cells 180 and 182 provide responses indicating said concentration. The response of cell 180 is transmitted to circuit 168 through lead 326, stationary contact 312a–5, movable contact 310a and lead 318. The response of cell 182 is simultaneously transmitted to circuit 168 through lead 328, stationary contact 312b–5, movable contact 310b and lead 320, it being understood that movable contact 310a has been moved into position to engage stationary contact 312a–5 as a result of the movement of the carriage to position flow cell 80f, the fifth flow cell at the light viewing station, and of course this is true also with respect to movable contact 310b and stationary contact 312b–5. Further indexing movement of the carriage results in the positioning of flow cell 80g at the light viewing station and the responses of photoelectric cells 184 and 186 are transmitted to circuit 168 to operate the recorder to provide that portion of curve 300 which indicates the potassium concentration of the sample. The circuit for cell 184 can be traced as follows: lead 330, stationary contact 312a–6, movable contact 310a and lead 318, and the circuit for cell 186 can be traced as follows: lead 332, stationary contact 312b–6, movable contact 310b and lead 320.

Further flow cell positioning movement of the carriage brings flow cells 80d and 80e, respectively, and in succession, at the light examining station wherein the responses of cells 172 and 174 are again transmitted to circuit 168 for operating the recorder to provide those portions of record 300 which indicate the concentrations of glucose and blood-urea-nitrogen, respectively, in the sample.

It is to be understood that the determination of the quantities of the different substances in the sample according to the sequence indicated herein is not critical but is preferred in order to reduce time. More particularly, the streams are examined in the order of the completion of the color reaction and the stream whose color reaction is completed first is examined first. The stream whose color reaction is completed last is examined last. In this manner the time for each examination is minimized to permit more rapid analysis. It will be understood that the stylus scribes a trace 336 slightly below the corresponding peaks and these traces occur during the cell positioning movement of the carriage for positioning each flow cell at the light viewing station. The traces only occur when the stylus moves from a low concentration to a high concentration. Due to the relatively rapid movement of the carriage, only a small amount of time is needed for the indexing movement of the carriage and the peak for one substance begins approximately at the same time as the peak for the preceding substance ends.

As an illustrative example of the speed of operation of the apparatus for determining the concentrations of a plurality of substances in a sample, it is to be noted that the invention has thus far been described with respect to the determination of eight different substances in a sample. Supply device 10 is operable to supply twenty separate samples to the apparatus for analysis per hour whereby 160 different analyses are recorded by the recorder each hour. The carriage is operated under the control of the timer so that cell positioning movement of the carriage occurs every 21 seconds. This allows each flow cell to remain at the light examining station for a period of 20¾ seconds and ¼ second is utilized for indexing movement of the carriage. Not more than twelve seconds are used for returning the carriage to reposition it for another cycle of operation, so that a total of 3 minutes is utilized for each cycle of operation of the carriage. The timer disk 208 completes one revolution every 3 minutes. The phasing previously referred to is such that during the 20¾ second period in which the flow cell is in the light viewing position, a portion of the completely reacted sample is passing through the respective flow cell or the spectral-flame burner, as the case may be, so that the corresponding photoelectric cells provide the correct responses according to the concentration of the substance and do so in properly timed relation with the other parts of the apparatus and in properly timed relation with the different treated streams.

The recorder and is control circuit 168 will now be described in detail with respect to FIG. 3. The recorder and its control circuit is of the type shown in U.S. Patent No. 3,031,917, issued May 1, 1962, and, as indicated above, is operable to record the results of the sequential examination of the individual streams to provide the record 300 (FIG. 4) which directly indicates the concentrations of the different substances, respectively, in each of the samples which are supplied, in succession, to the apparatus. The response of each of the reference photoelectric cells, namely cells 172, 180 and 184, is transmitted to one resistor of a series of load resistors identified by the reference numerals 340a to 340h, respectively, and the response of each of the sample cells, namely cells 174, 182 and 186, is transmitted to one of a series of load resistors identified by the reference numerals 342a to 342h, respectively, so that a voltage is provided across each of the load resistors corresponding to the responses of the photoelectric cells. The load resistors are connected in a null-type current ratio balancing system which compares the responses of the photoelectric cells to obtain a series of values, in succession, which directly indicate the concentrations of the different substances in the sample.

The null-type balancing circuit includes a slidewire potentiometer 344 and terminal end 346 of the slidewire is adapted to be connected to one side of reference load resistors 340a to 340h, respectively, and the other terminal end 348 of the slidewire is adapted to be connected to the other side of the reference load resistors, as will be more clearly understood hereinafter. The sample load resistors 342a to 342h, respectively, are each provided with taps 350a to 350h, respectively. The voltages at the taps of the sample load resistors are transmitted, in succession by the action of movable contact 310g and its corresponding stationary contacts 310g–1 to 310g–8, respectively, to one side of a balancing system 352, via movable contact 310g, lead 354, and a four-pole double throw switch 356. The potentiometer slidewise is provided with a movable tap 360 and the voltage at said tap is transmitted to the other side of the balancing system via lead 362 and switch 356. The differences between the voltages transmitted to the balancing system, and which correspond to the differences between responses of the sample and reference photoelectric cells, operate the system to balance it and the balancing operation of the system results in the scribing of record 300 on the chart 164 of the recorder by the recorder stylus 366.

The balancing system 352 comprises a vibrating reed converter 368 which is coupled, by transformer 370, to an amplifier 372. The output of the amplifier is applied to one-phase winding 374 of a two-phase motor 376 whose other winding 378 is energized by the A.C. source 380. The shaft 382 of the motor drives the potentiometer tap 360 to balance the circuit and the shaft concomitantly drives the stylus 366 of the recorder which is coupled to the tap so that the balancing movement of the tap results in the scribing of record 300.

The series of load resistors for the reference side of the circuit is necessary for varying the characteristics of the circuit so that record 300 directly indicates the concentrations of the different substances in each of the samples. The series of load resistors for the sample side of the circuit is necessary to equalize the voltage outputs of the sample side for the various substances from which the sample is being analyzed. It is to be noted that eight different load resistors are provided for each side of the circuit and correspond in number to the different substances for which the sample is being analyzed.

As shown by FIG. 4, the chart paper 384 of the recorder is a longitudinally extending web of paper which is fed from a roller and is driven by a motor of the recorder in the direction indicated by arrow 386 in FIG. 3, transversely of the back-and-forth movement of stylus 366 of the recorder. The chart paper is divided into a series of charts 164 which may be separated from the paper along the perforations 388. Each chart includes provision for indicating the concentrations of the different substance in a sample and, as illustrated herein, is arranged to indicate the concentrations of eight different constituents of a blood sample from a particular patient who can be identified on the chart as indicated. It is thus seen that, in accordance with the invention, the concentrations of the different substances of a series of blood samples from a series of different patients can be readily determined accurately, quickly and in an extremely convenient manner for use in the hospital, by the physician, and otherwise.

Each chart 164 is provided with ordinate scales 390 of concentration values expressed in any convenient manner. For example, with respect to the first two scales, which are identified along the bottom of the chart for albumin and total protein, respectively, the scales are in gram percent. With respect to the last or eighth ordinate scale, which is identified for blood-urea-nitrogen, the concentration scale is expressed in milligram percent, and the remaining ordinate scales are expressed in milliequivalents per liter. The different concentration scales provide a convenient means by which the concentrations of the different substances are indicated and such indications of concentrations are well understood. It is to be observed that each ordinate scale is provided with a shaded area 392 which is especially useful in providing a quick indication to the physician or nurse as to whether the concentration of the particular substance in the patient's blood is within the normal range and, as illustrated herein, the peaks 334 of the record 300 are within the normal range with respect to all the substances for which the blood sample is analyzed.

It is to be observed from FIG. 4 that the concentrations of the various substances are required to be indicated by different scales and it is necessary to control the movements of the stylus of the recorder so that it moves in proper relation to the respective scales for each substance. This is accomplished by providing slidewire 344 of the potentiometer with a series of top points **394*a* to 394*h*, respectively, and a corresponding number of slidewire resistors 396*a* to 396*h*, provided with corresponding taps 398*a* to 398*h*, respectively, are also provided. Each resistor 396 is adapted to be connected in series with terminal end 346 of the potentiometer slidewire and with a terminal end of a companion reference load resistor 340, so that the corresponding tap point of the potentiometer slidewire is provided with the proper voltage. This is necessary for positioning tap 360** of the potentiometer slidewire at its proper position with respect to the scale of the chart for the particular substance, as will be more clearly understood hereinafter.

As indicated in the U.S. patent application of Milton H. Pelavin, Serial No. 214,080, filed August 1, 1962, assigned to the assignee of the present application, the positions of the concentration units of the different ordinate scales are established in the following manner. A series of standards are transmitted through the apparatus, some of which contain known high concentrations of each of the substances for which the samples are to be analyzed, and others of which contain known low concentrations of the same substances for which the samples are to be analyzed to establish and bracket the expected high concentration and expected low concentration of each of the substances. The maximum excursions or positions of the stylus 366, corresponding to the maximum and minimum concentrations for each of the different substances, are noted and these different positions establish the correct positions of the concentration units for the chart paper. The chart paper can then be printed having ordinate scales with the different concentration units properly positioned thereon as determined by analysis of the standards. The ordinate scales and shaded areas of the chart can be printed on the chart paper 384 prior to the examination of the samples so that the results of said examination are recorded on pre-calibrated paper. The calibrations can also be printed on the chart paper after the examination of the samples, or even concurrently with the examination of the samples.

The printing of the ordinate scales on the chart paper, concurrently with the examination of the samples, may be readily accomplished by provision of a printing device secured to the recorder and in position for printing the chart paper as it moves through the recorder. The printing device can be provided with a series of printing plates which print the separate scales, in succession, on the chart paper during the movement thereof. The printing plates with the corresponding ordinate scale can be easily provided, since the previous examination of the known standards establishes the positions on the chart paper for the different concentration units. Each plate can be formed from a stretchable strip of material having raised numeral concentration values equally spaced from each other longitudinally of the material to permit stretching of the material so that the maximum and minimum concentration units are properly positioned with respect to the corresponding positions therefor on the chart. In its stretched condition, the material can be secured to a wooden or metal backing member to form a printing plate for one of the ordinate scales and the printing plates for the other scales can be made in a similar manner. Obviously, the invention is not limited to pre-calibrated chart paper.

Figure 3A:
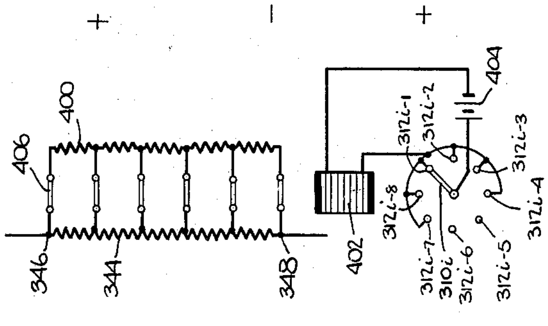
FIG. 3A is a wiring diagram of part of the circuit of FIG. 3.

It is to be noted from FIG. 4 that each of the ordinate scales of concentration units is linear even though the relation between concentration and light transmission, as provided by the colorimetric examination of the samples, is logarithmic according to Beer's law. The examination with respect to the sodium and potassium contents of the samples is by spectral-flame analysis and the ordinate scale is linear since spectral-light emission and concentration vary linearly. To provide a linear concentration scale for the substances whose concentrations are determined colorimetrically, the potentiometer slidewire 344 is linearized in accordance with the principles illustrated and described in U.S. Patent No. 3,031,917, issued May 1, 1962. As illustrated by FIG. 3A, the potentiometer slidewire is provided with a series of linearizing shunt resistances 400 which are adapted to be connected, in shunt relation, with the potentiometer slidewire, during colorimetric examination only of the streams, so that the excursion of the stylus 366 of the recorder is linear. For this purpose selector switch 176 is provided with another movable contact **310*i* and the corresponding stationary contacts 312*i*–1 to 312*i*–8, respectively. The contacts of the switch control the operation of a relay 402 which is adapted to be energized by battery 404 and the relay is provided with a series of switches 406 which are adapted to connect the corresponding shunt resistances 400 across the slidewire 344 during the colorimetric examination of the treated streams. It is to be noted that when movable contact 310*i* engages stationary contacts 312*i*–5 and 312*i*–6, which are at positions corresponding to the spectral-flame analysis of the samples with respect to sodium and potassium, respectively, the relay is de-energized so that switches 406** are open and the shunt resistances are disconnected from the potentiometer slidewire.

Each of resistors 396 is adapted to be connected, as indicated above through the operation of contact **310*e* and contacts 312*e* of the selector switch, in series with slidewire 344 between terminal end 346 of the slidewire and one end of the companion reference load resistor 340 through a four-pole double throw reversing switch 408. Resistors 396 control the current flow through the portion of slidewire 344 between terminal end 346 and the corresponding tap points 394** and adjustment of the companion taps 398 provide the proper voltage at said tap points for the particular analysis, as will be more clearly understood hereinafter. The operation of the control circuit will now be described with respect to the associated electrical components of the circuit for the direct indication of the concentration of one of the substances in the sample, it being understood that the adjustment and operation of the circuit is the same for the other substances.

As shown in FIG. 3, the circuit is in position for the examination of the sample with respect to its albumin content. The highest expected concentration of albumin is six grams percent, and the lowest expected concentration is one gram percent. With flow cell 80 in the light examining position to determine the albumin content of the stream flowing through said flow cell, the movable contacts 310 of the selector switch 176 are in the first position so that the corresponding stationary contacts 312–1 are engaged, and tap point 394*a* of the potentiometer slidewire, which corresponds to the stylus position for the high concentration value, is connected in the circuit. Similarly, resistor 396*a* corresponding to the first examining position is also in the circuit through the engagement of movable contact 310*e* and stationary contacts 312*e*–1 of the selector switch. Tap 398*a* is set approximately at its mid-point. The ohmic values of the reference load resistors 340 are relatively low and provide a source of voltage for the corresponding tap points 394 of the potentiometer slidewire 344. The reference load resistors are provided with movable taps designated 410*a* to 410*h*, respectively, and load resistor 340*a* is connected in the circuit, due to the engagement of movable contact 310*c* and stationary contact 312*c*–1 of the selector switch. The position of tap 410*a* is selected so that the voltage at the selected tap point 394*a* corresponds to the portion of the voltage across slidewire 344 at said tap point.

A solution having a 100 percent light transmission characteristic is transmitted through flow cell 80 of colorimeter 82 and tap 350*a* of sample load resistor 342*a* is adjusted so that stylus 366 moves to a position which corresponds to the 100 percent light transmission position or 0 concentration at the bottom of chart 164. Resistor 342*a* is in the circuit due to the engagement of movable contact 310*g* and stationary contact 312*g*–1 of the selector switch. A high concentration standard, which has a concentration of 6 in the case of albumin is transmitted through flow cell 80 and tap 410*a* is adjusted when the stylus is at its peak position so that the stylus is at the correct concentration position of 6 as indicated on the chart. A low concentration standard, which has a concentration of 1 with respect to albumin, is then transmitted through the flow cell 80 and tap 398*a* is adjusted when the stylus is at its lowest position so that it is at the position corresponding to the concentration of 1 as indicated on the chart. The foregoing adjustments or standardization operations are preferably done from day to day to obviate any minor variations which might occur from one day to the next or from one week to the next. Movement of tap 398*a* does not substantially affect the voltage at the preselected tap point 394*a* because of the relatively high resistance of the potentiometer slidewire 344 in comparison to the relatively low resistance of resistor 340*a*, which is about $1/40$ of the resistance of the potentiometer slidewire. The apparatus is now in condition for providing direct readings on the chart paper of the albumin content of the sample, and the other resistors and taps are adjusted in the same manner for the other substances, respectively.

In the case of albumin, total protein, blood-urea-nitrogen and chlorides, the responses of the photoelectric devices decreases with increased concentration whereas in the cases of glucose, carbon dioxide, sodium and potassium, the responses of the photoelectric cells increases with increases in concentrations. As a result, the stylus would normally move in a direction which is opposite to its movement for increased concentrations in the case of the latter group as compared to the former group. To avoid this, a reversing circuit 412 is provided which, during examination of the samples with respect to the latter group, reverses the input to the balancing system 352 and also reverses the voltage across the potentiometer slidewire 344. The reversing circuit includes a battery 414 which operates a reversing relay 416 through the movable contact 310*h* and the corresponding stationary contacts 312*h* of the selector switch 176. The relay operates the previous mentioned switches 356 and 408. Switch 356 is operable to reverse the input to the balancing system 352 and switch 408 is operable to reverse the voltage across the potentiometer slidewire 344.

As shown in FIG. 3 with respect to the examination of the sample as to its albumin content, the signal from the positive side of the sample photoelectric cell is transmitted to the balancing system via lead 320, movable contact 310*g*, lead 354, switch 356 and lead 417. During reversal of the switch, as determined by the energization of relay 416, the same signal is transmitted to the balancing system through the other side thereof, namely through lead 418. In the position shown, the voltage at tap 360 is transmitted to the balancing system via lead 362, switch 356 and lead 418. In the reversed position of switch 356, the voltage at tap 360 is transmitted to the other side of the balancing system via lead 362, switch 356 and lead 417.

As shown, the signals from the positive side of the reference photoelectric cells are transmitted to the terminal end 348 of the potentiometer slidewire 344 via lead 420, switch 408, and lead 422. In the reversed position of switch 408, the signal from the negative side of the reference photoelectric cells is transmitted to terminal end 348 via lead 424, switch 408 and lead 422. In the position shown, terminal end 346 of the potentiometer is connected to the negative side of the reference photoelectric cells via lead 426, movable contact 310*e* and its corresponding stationary contact 312*e* of the selector switch, resistors 396, lead 428, switch 408 and lead 424. In the reversed position of switch 408, terminal end 346 of the potentiometer slidewire is connected to the positive side of the reference photoelectric cells through lead 428, switch 408 and lead 420.

It is to be noted that relay 416 is only energized, to reverse switches 356 and 408, when movable contact 310*h* of the selector switch engages stationary contacts 312*h*–4, 312*h*–5, 312*h*–6 and 312*h*–7. It will be understood that these latter contacts are engaged when the apparatus is in position for examining the sample with respect to its carbon dioxide, sodium, potassium and glucose contents, respectively.

Figure 5:
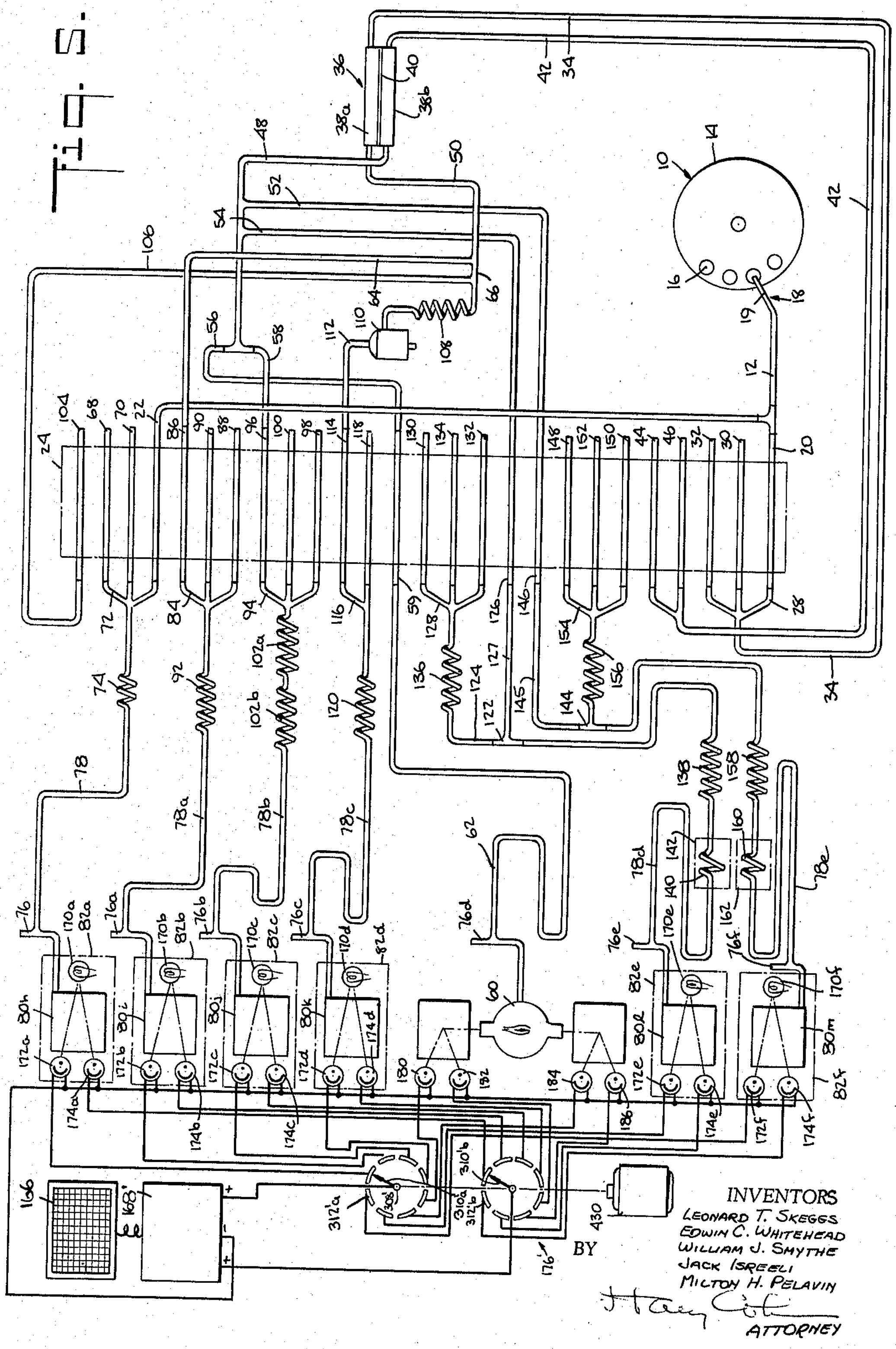
FIG. 5 is a more-or-less diagrammatic illustration of the method and apparatus of the invention according to a modification thereof.

Referring now to FIG. 5, there is shown a modification of the invention in which separate colorimeters are provided, each containing its own flow cell, light source and photoelectric cells, in lieu of colorimeter 82 which has separate flow cells but a single light source and a single pair of photoelectric cells. The separate colorimeters are identified by the reference numerals 82*a*, 82*b*, 82*c*, 82*d*, 82*e* and 82*f*, and the corresponding light sources are identified as 170*a*, 170*b*, 170*c*, 170*d*, 170*e* and 170*f*. The corresponding flow cells are identified by reference numerals 80*h*, 80*i*, 80*j*, 80*k*, 80*l* and 80*m*, respectively. The corresponding reference photoelectric cells are identified by the reference numerals 172*a*, 172*b*, 172*c*, 172*d*, 172*e* and 172*f*, and the corresponding sample photoelectric cells are identified by the reference numerals 174*a*, 174*b*, 174*c*, 174*d*, 174*e* and 174*f*, respectively. The spectral-flame photometer 60 is the same as previously described with respect to FIG. 1 and is provided with the same photoelectric cells. The proportioning pump 24, pump tubes, supply device 10 and various conduits for the separate treatment of the individual streams with respect to different substances, respectively, and the phasing thereof with respect to each other is the same as previously described with respect to FIG. 1, and are similarly identified.

Since there are individual colorimeters provided with their own light source and flow cell, there is no need to position the flow cells, in succession, at a common light examining station and, therefore, the timing and control circuit of FIG. 2 is not required with the apparatus illustrated by FIG. 5. Instead, the previously described drum-type selector switch 176 is replaced with a selector switch 176' which is identical to switch 176 with the exception that the stationary contacts 312' are conducting segments in lieu of the stationary point contacts 312 of switch 176 so that selector switch 176' functions as a timing device as well as a control device. It is to be noted that each of the movable contacts 310' has associated therewith eight stationary contacts 312', the same as switch 176, and the same as the number of substances for which the sample is being analyzed. In lieu of the intermittent movement of the carriage for controlling switch 176, switch 176' is operated by a synchronous motor 430 which is suitably geared to drive the operating shaft 308' of switch 176' so that the movable contacts of the switch make one revolution every three minutes. Since there are eight stationary contacts associated with each movable contact, all in the form of segments of a circle, each of the segments is separately contacted by the associated movable contact for about 22½ seconds which is the period of the separate examinations of each stream so that twenty different samples, as illustrated herein, are examined in succession with respect to eight different substances contained in each of the samples in one hour.

It is to be observed from FIG. 5 that during the operation of the selector switch 176' by motor 430, the signals from each pair of sample and reference photoelectric cells are transmitted through the switch, in sequence, one after another, to the recorder measuring and control circuit 168', as indicated by the electrical connections between the different pairs of cells and the different contacts of the switch. Circuit 168' is identical to circuit 168 illustrated by FIGS. 3 and 3A with the exception that the stationary contacts of the parts of the selector switch which are shown on said figures are segments, as illustrated by FIG. 5, in lieu of point contacts as illustrated by FIGS. 3 and 3A.

While the recorder means described herein is the type which is provided with a stylus, it is within the scope of the present invention, except as otherwise specifically indicated in the specification or claims, to employ a printing recorder to print, in succession, on recorder paper, the numerical concentration values of the substances with respect to which the analyses are made.

The remaining figures of the drawings, namely FIGS. 6 to 17, illustrate the structural details of the colorimeter 82 which is provided with a movable carriage 178 for movement of a plurality of flow cells, in succession, into and out of a light viewing station.

The carriage 178 of the colorimeter comprises an upper bar 432, an intermediate bar 434 and a lower bar 436, all of which are secured to each other by longitudinally spaced screws 438. Intermediate bar 434 is positioned in an elongated slot 440 provided in the base support plate 442 of the colorimeter. Lower bar 436 is provided with longitudinally extending V-shaped grooves 444 provided along each of its sides and which are in sliding contact with a number of steel balls 446 which are retained in V-shaped recesses 448 provided in a pair of laterally spaced bars 450 which are secured to the bottom of support plate 442, so that carriage 178 is movable on said balls, transversely of light source 170, which is an electric lamp.

As previously indicated, the mechanism for moving the carriage intermittently and transversely of the light comprises the previously mentioned rack 200 which is mounted below bar 436 in engagement with the previously mentioned gear 198. The drive for operating gear 198 comprises the previously mentioned motor 188 having an output shaft 452 which is connected to a rotary shaft 454 through a coupling 456. Shaft 454 extends into a block 458 which is secured to the housing of the motor by a support plate 460 and screws 462 and 464. The ends of shaft 454 are supported in bearings 466 which are mounted in block 458 and a worm 468 is secured to the shaft. The worm engages a worm wheel 470 which is positioned in a recess 472 provided in block 458 and is suitably secured to a rotary shaft 474 which is supported at the upper end of the block and extends through the recess of the block below the bottom thereof. The previously mentioned Geneva driver member 194 is mounted on the extending part of shaft 474 in operative relation with the previously mentioned Geneva driven member 196. The latter is mounted on a rotary shaft 476 which is supported in spaced bearings 478 that are mounted in an aperture 480 provided in block 458, and one end of shaft 476 extends upwardly from the block. The rack driver gear 198 is mounted on said extending end of the shaft.

Figures 9, 9A:
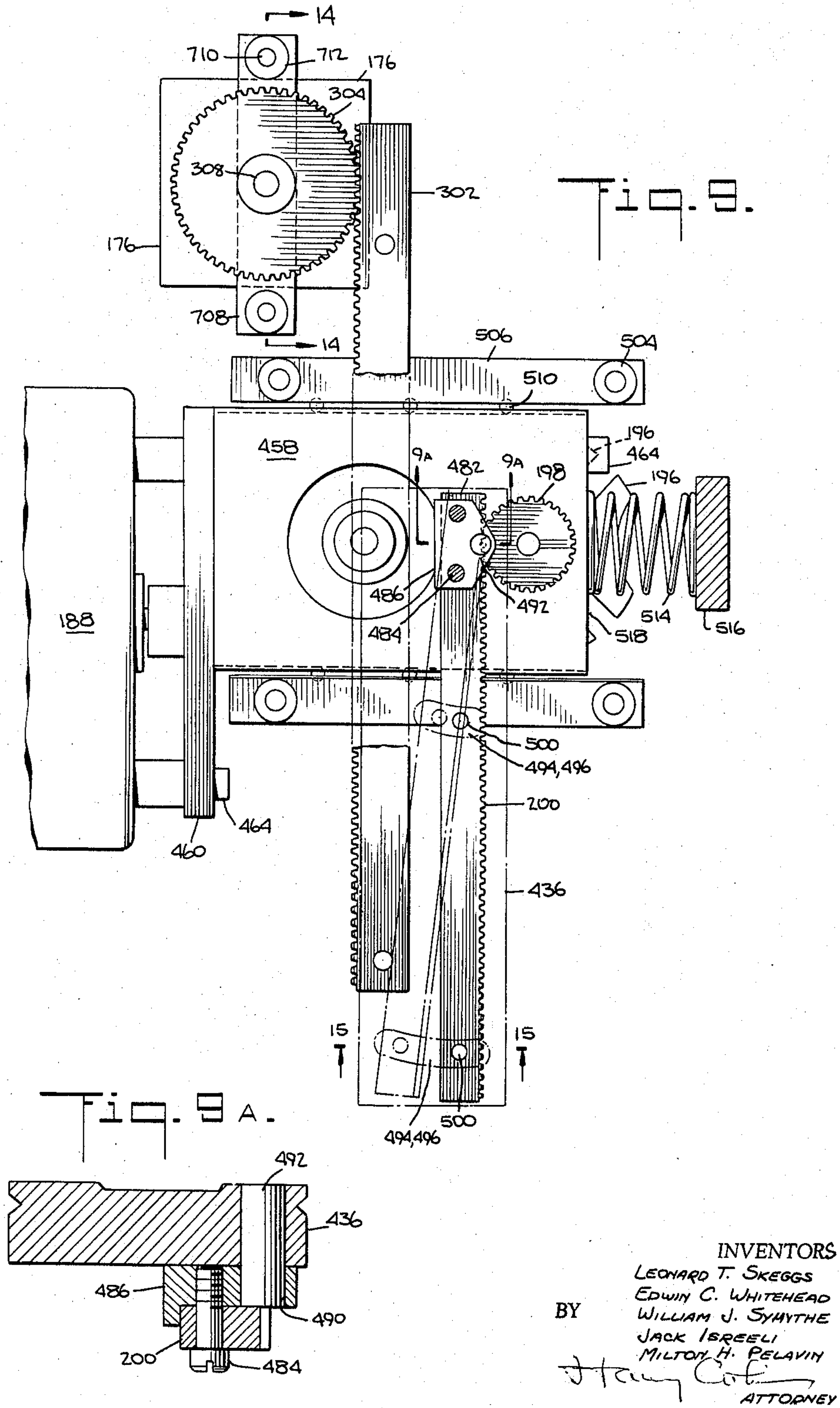
FIG. 9 is a horizontal sectional view taken on line 9—9 of FIG. 7.
FIG. 9A is a vertical sectional view, on a larger scale, taken on line 9A—9A of FIG. 9.
Figure 10:
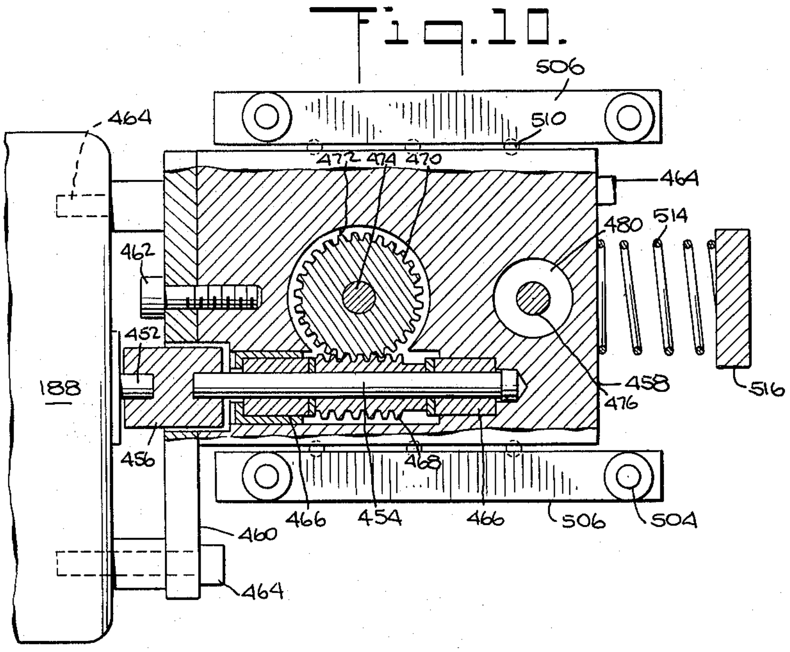
FIG. 10 is a horizontal sectional view taken on line 10—10 of FIG. 7.
Figure 11:
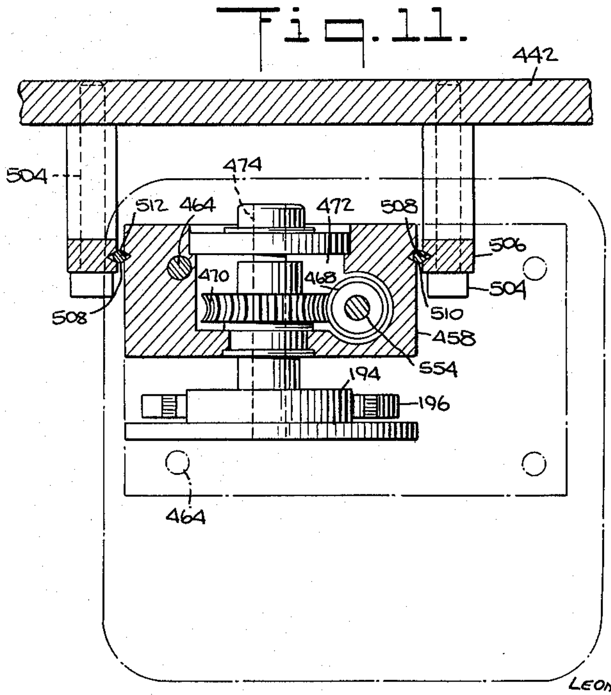
FIG. 11 is a vertical sectional view taken on line 11—11 of FIG. 7.
Figure 15:
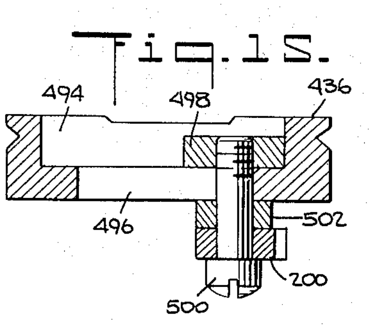
FIG. 15 is a vertical sectional view, on a larger scale, taken on line 15—15 of FIG. 9.
Figure 16:
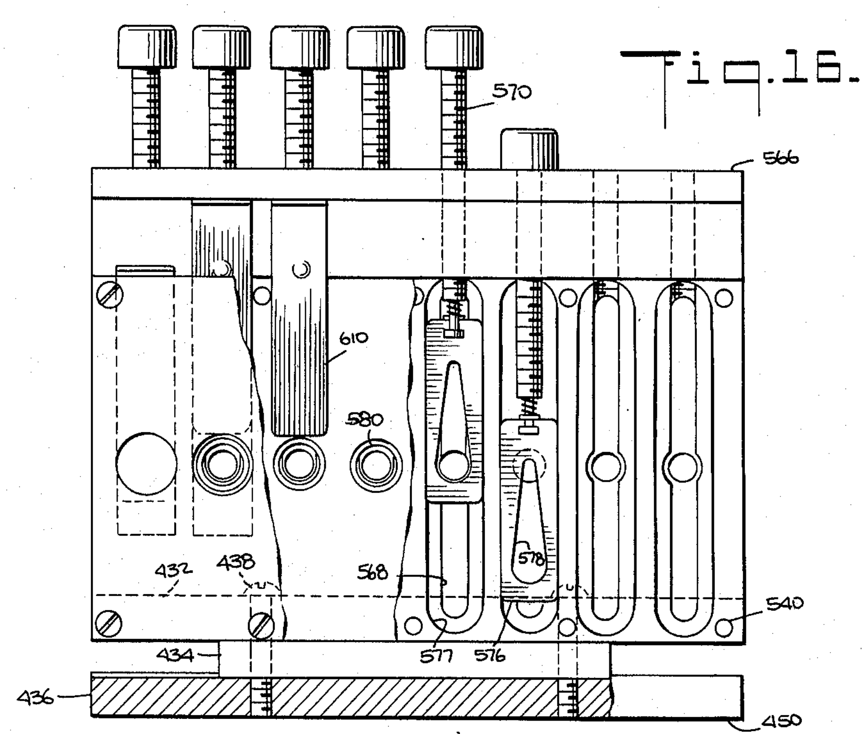
FIG. 16 is a vertical sectional view taken on line 16—16 of FIG. 7 and with portions cut-away for purposes of illustration.
Figure 17:
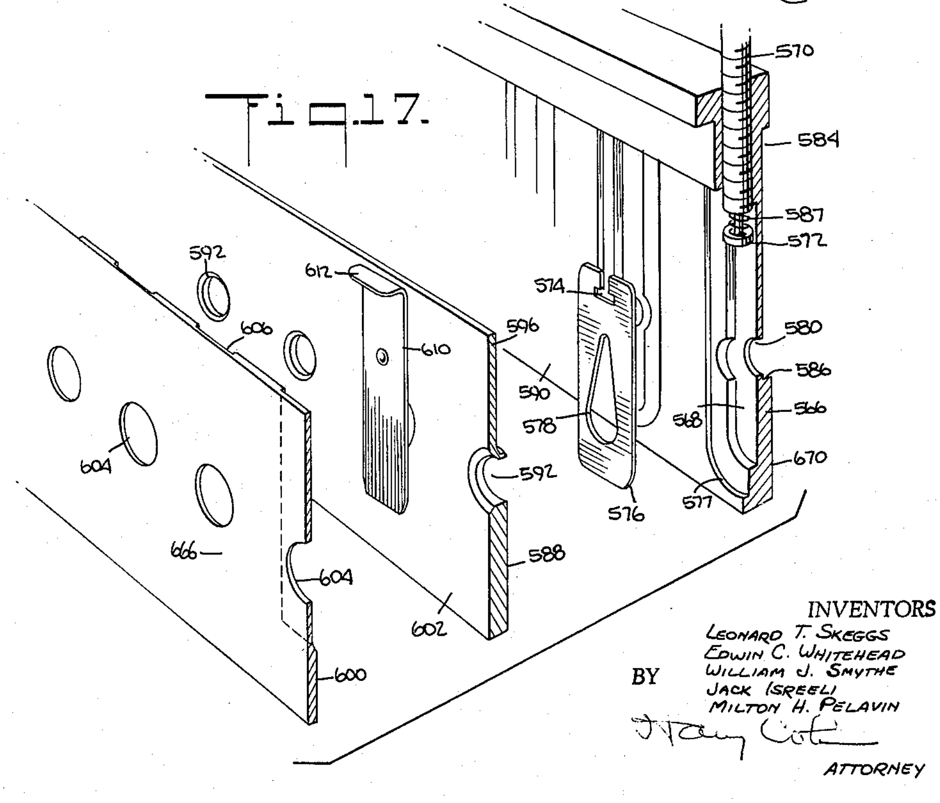
FIG. 17 is an exploded perspective view illustrating the relation of the parts of the shutter of the colorimeter.

In order to permit variations in the length of movement of the carriage, without varying the speed of the motor or changing the mechanical connection between the motor and the carriage drive rack 200, the rack is mounted on the carriage so that it can be pivoted, as illustrated in FIG. 9. More particularly, one end 482 of the rack is secured, by screws 484, to a member 486 that is in sliding surface-to-surface contact with the undersurface of the lower bar 436 of the carriage. Member 486 has a hole 490 into which a pivot pin 492 rotatably extends. The pivot pin is secured to bar 436 and extends downwardly therefrom into hole 490 and the rack is free to pivot about the pin and is supported for said pivotal movement below bar 436 at positions intermediate its length and at its other end, as illustrated by FIGS. 9 and 15, it being understood that the means for supporting the rack at both these positions are identical. Bar 436 is provided with an upper arcuate slot 494 and a lower arcuate slot 496, which are in registry with each other, and each pair of slots is at the free end of the rack and at a position intermediate the length of the rack. The width of the lower slot is slightly less than the width of the upper slot so that a member 498 can move back and forth in the upper slot without falling through the lower slot. A screw 500 extends through the lower slot and is screwed into member 498 and carries rack 200 adjacent its head. A spacer 502 is provided between the bottom of bar 436 and the upper surface of the rack, and it will be understood that the construction illustrated by FIG. 15 is the same for both the intermediate and the end positions of the rack. The foregoing construction permits pivotal movement of the rack and locking thereof in position at the correct angular position of the rack.

Rack drive gear 198 is mounted for movement so that it is always in proper engagement with the teeth of the rack even though the latter is at an inclination. For this purpose, motor 188 and block 458 are suspended from colorimeter base support plate 442 for sliding adjustable movement to insure proper engagement of the gear and rack at all times. Four support posts 504 extend downwardly from base plate 442 and carry a pair of laterally spaced guides 506 which are provided with V-shaped recesses 508 along their respective confronting sides. Each recess retains a steel ball 510 and the sides of block 458 are provided with V-shaped longitudinally extending grooves 512 which engage balls 510, in sliding relation therewith, so that the block can slide along the rails. A compression spring 514 has one of its ends in abutment with a part 516 which extends downwardly from support plate 442, and the opposite end of the spring is in engagement with the confronting end 518 of the block, so that gear 198 is biased into engagement with rack 200. It is to be observed, that due to the suspended and movable mounting of the motor and its connected parts, gear 198 moves toward the rack, during the operation thereof, when the rack is in an inclined position as illustrated by FIG. 9.

The flow cells, namely cells 80, **80*a*, 80*b*, 80*c*, 80*f***, 80*g*, 80*d* and 80*e*, are mounted on the carriage 178 of the colorimeter in individual companion flow cell holders 520, 520*a*, 520*b*, 520*c*, 520*f*, 520*g*, 520*d* and 520*e*, respectively. Each flow cell is mounted in its corresponding holder and the flow cell and holder assembly can be manually engaged by a handle 522 for easy mounting and removing of the flow cell and holder assembly from the colorimeter.

The flow cell and holder, per se, are the invention of Jack Isreeli, one of the co-inventors of the present invention, and are claimed in his copending U.S. patent application, Serial No. 231,408, filed October 8, 1962, assigned to the assignee of the present application. Briefly described, the flow cell is a hollow transparent tubular member having a vertical inlet tube 524, a horizontal liquid passage 526 and a vertical outlet tube 528. The holder has opposite ends 530 and 532, respectively, which are hollow cylinders to permit the light to pass therethrough. The holder includes longitudinally spaced walls 534 having light apertures 536 in confronting relation with the opposite ends of passage 526 to permit the light to pass horizontally from light source 170 through the liquid in passage 526 and therefrom to the previously mentioned sample photoelectric cell 174. One or more filters 527 are suitably provided in hollow end 530 of the holder.

End 530 of the flow cell holder is resiliently and releasably held in position in a support mount 538 that is secured, by screws 540, to one side of upper bar 432 of carriage 178. End 532 of the holder is removably mounted in position in a support mount 542 that is secured to the other side of upper bar 432 by screws 544.

Figure 13:
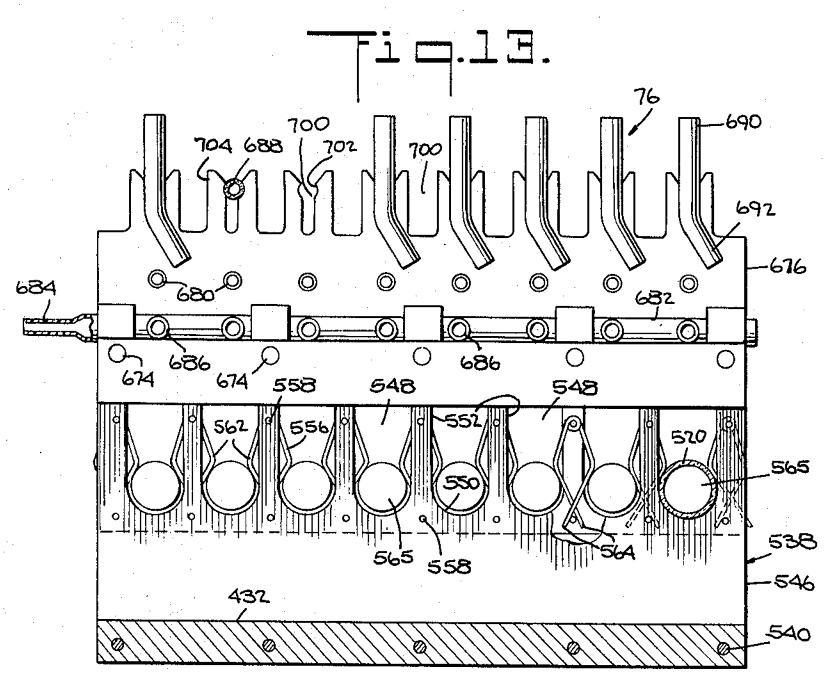
FIG. 13 is a vertical sectional view taken on line 13—13 of FIG. 7.
Figure 12:
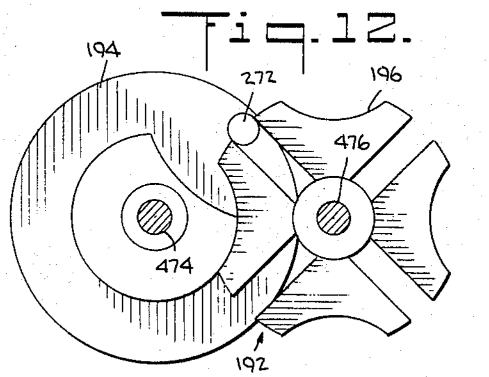
FIG. 12 is a horizontal plan view taken on line 12—12 of FIG. 7.
Figure 14:
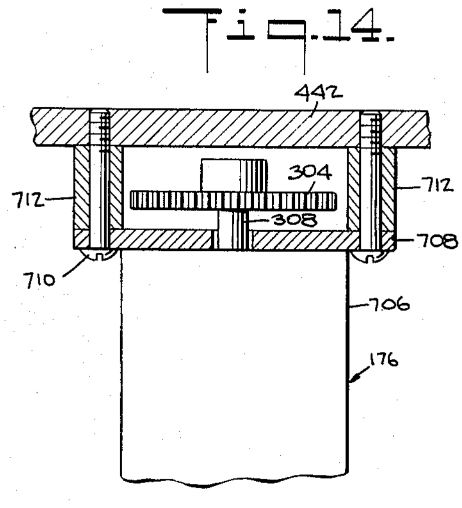
FIG. 14 is a vertical sectional view taken on line 14—14 of FIG. 9.

Mount 538 comprises a transversely extending plate 546 provided with a series of vertically extending, longitudinally spaced slots 548 which are provided with semi-circular bottoms 550 against which the lower halves of cylindrical ends 530 of the holders rest in the mounted condition thereof, it being understood that the slots 548 correspond in number to the number of flow cell and holder assemblies. Adjacent slots are separated from each other by intervening partition walls 552 which are slotted as at 554, and a spring clip 556 is mounted in each slot. For this purpose, a pair of vertically spaced pins 558 are positioned in each of the slots, and extend transversely thereof, and the opposite ends of the pins are mounted in the adjacent portions of walls 552. The opposite sides 560 of the holders (FIG. 6) are flat and slidably engage the adjacent sides of walls 552. The spring clips have V-shaped arms 562 and their ends 564 cross each other, as shown by FIG. 13, and engage the lower pins 558 while the upper ends of the spring clips are mounted on the upper pins. The arms are spring biased against the adjacent sides of ends 530 of the flow cell holders for releasably and resiliently retaining said ends in position in mount 538. To remove the holders from their mounted positions in the colorimeter, it is merely necessary to pull the holders by their handles 522, vertically upwardly whereby ends 530 are readily removed from their spring engagements in the colorimeter. Plate 546 is provided with light apertures 565 in registry with ends 530 of the holder to permit passage of light to photoelectric cell 174.

Mount 542 for the opposite ends 532 of the flow cell holders includes provision for varying the size of the light apertures so that the amount of light which passes through the liquid undergoing colorimetric examination can be controlled readily. The mount comprises a transversely extending plate 566 which has a series of vertical grooves 568 that are longitudinally spaced from each other, in a direction transversely of the light. A series of adjusting screws 570 extend into grooves 568, respectively, and the lower end of each of the screws has a pin 572 which is rotatably mounted in a slot 574 provided at the upper end of a light aperture shutter 576 which is mounted for vertical sliding movement in a slot 577. The slot 577 is provided at every position of slots 568 as are the shutters, and each shutter is provided with a tear drop-shaped aperture 578 which is in registry with an aperture 580 provided in plate 566 at each position of a flow cell. The shutter is adapted to vary the size of said aperture by vertical movement of the shutter in relation to the companion aperture 580. The rear surface of plate 566 is provided with a vertical slot 584 at each position of screw 570 and the bottoms 586 of each of slots 584 is semi-circular and provides a support for the bottom half of cylindrical end 532 of the flow cell holder 520. Slot 568 provides a vertical space (FIG. 7) in which part of pin 572 moves and springs 587 resiliently hold the pins in engagement with the companion shutters 576.

A transversely extending plate 588 is positioned against the forward surface 590 of plate 566, in surface-to-surface contact therewith, and the plate is provided with a series of longitudinally spaced light apertures 592 in registry with the corresponding apertures 580 of plate 566. The upper part 596 of plate 588 is thinner than its lower part to provide a longitudinally extending space 598 (FIG. 7) for the pin ends 572 of the adjusting screws 570.

Another longitudinally extending plate 600 is positioned against the front face 602 of plate 588, in surface-to-surface contact therewith, and is provided with a series of longitudinally spaced light apertures 604 which are in registry with the corresponding apertures 592 and 580 of plates 588 and 566, respectively. At each position of aperture 604, there is provided a relatively shallow vertical slot 606 in which a thin light-blocking shutter 610 is positioned and which is adapted to be moved vertically in its respective slot for closing adjacent aperture 592 so that no light can pass into the flow cell. The shutter is provided with an upper bent part 612 by which it can be moved up and down and it will be understood that it is frictionally held in position since all the plates are clamped together and held in position on bar 432 of carriage 178 by screws 544.

Figure 7:
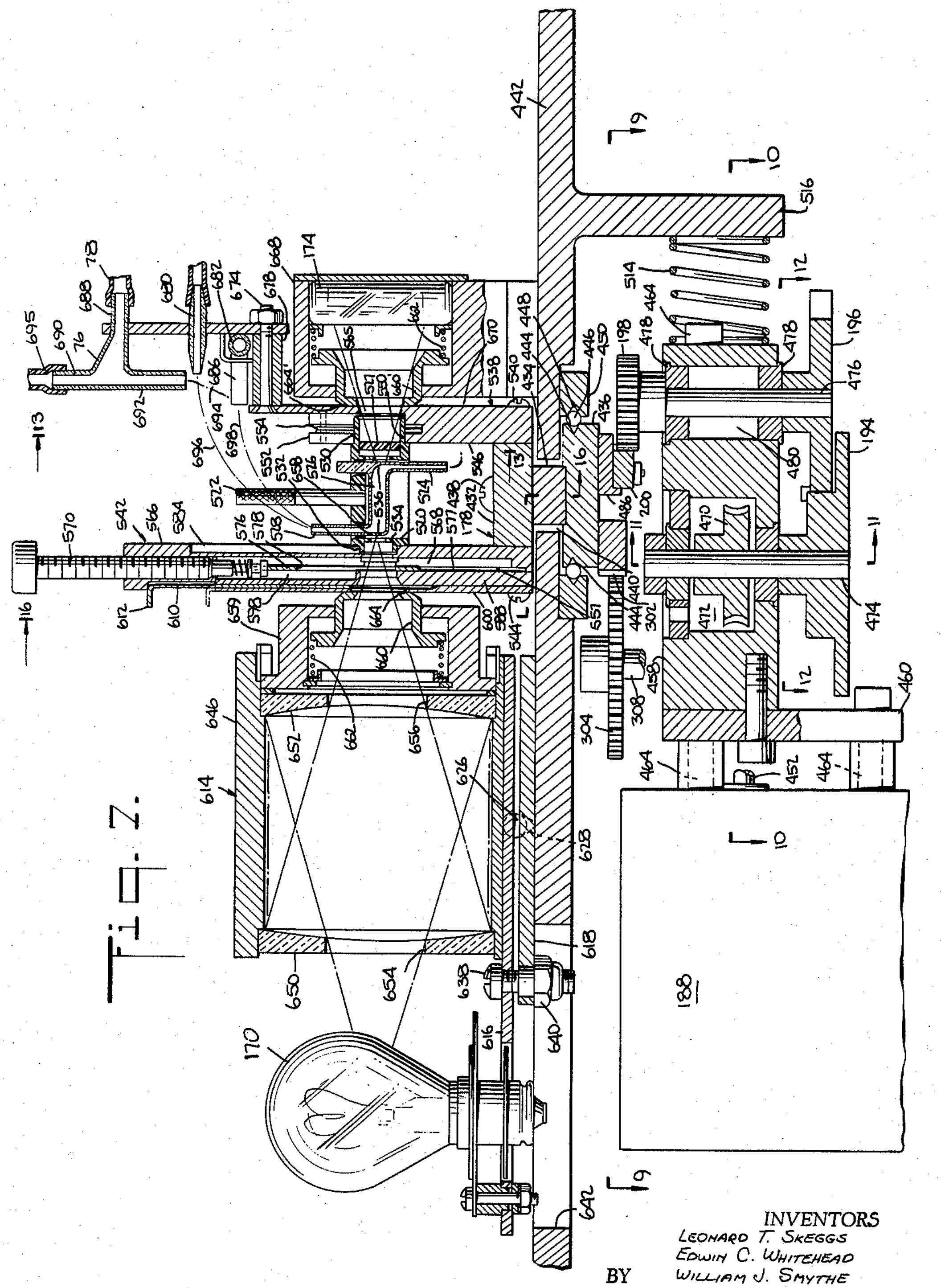
FIG. 7 is a vertical sectional view of the colorimeter.

Lamp 170 and lens holder assembly 614 are mounted on a support plate 616 which can be tilted longitudinally in the direction of the light path and which can be moved both laterally, in a direction transversely of the light path and longitudinally in a direction parallel to the light path for focusing the light at one end of light passage 526 of the flow cell, as shown in FIG. 7. More particularly, a support plate 618 is mounted for both lateral and longitudinal adjusting movement on the upper surface of base plate 442. For this purpose, a pair of laterally spaced screws 620 extend through clearance holes 622 provided in the corners of one side of plate 618 and the screws are screwed into base plate 442. Each screw 620 extends through a clamping member 624 which overlies the corresponding hole 622 so that plate 618 can be adjustably clamped into position by tightening screws 620. It is to be observed that holes 622 are considerably larger than the outside diameter of screws 620 for permitting both lateral and longitudinal adjusting movement of plate 618.

Plate 616, which carries light bulb 170 and focusing lens holder 614, is mounted on plate 618 so that it may be tilted relative thereto in a direction which is longitudinal of the light path. More particularly, a pair of laterally spaced ball supports 626 are rotatably mounted in corresponding conical holes 628 provided in plate 618 and plate 616 is provided with corresponding hemispherically shaped holes 630 for receiving the balls. A pair of laterally spaced screws 632 extend through clearance holes 634 provided in the corners of plate 616 which are adjacent carriage 178, and the screws are screwed into plate 618. A conically shaped compression spring 636 is provided for each screw and one end of the spring engages the head of the screw while the opposite end of the spring engages the upper surface of plate 616. A tilt adjusting screw 638 is positioned centrally between spring biased screws 632, and is spaced laterally from spherical supports 626 so that said supports are between adjusting screw 638 and spring biased screws 632. Screw 638 extends through plates 616 and 618, respectively, and is provided with a nut 640 which may be tightened or loosened against the spring bias of springs 636 so that plate 616 can be tilted, either up or down as viewed in FIG. 7, about its spherical supports 626. The lower end of screw 638 extends into an opening 642 provided in base plate 442 and which also serves to provide cooling air for lamp 170. The base plate is also provided with laterally spaced clearance holes 644 to receive the extending ends of screws 632.

The lens holder 614 is a cylindrical sleeve 646 having a flat bottom which is secured to plate 616 by screws 648. Concave mirrors 650 and 652 are mounted in confronting relation at the opposite ends of the sleeve, thereby closing said opposite ends. The mirrors are of the type wherein the mirrored surface is constituted by the front surface thereof. Mirror 650 is provided with a central aperture 654 and mirror 652 is provided with a similar aperture 656. As best seen in FIG. 7, light from the source 170 enters through the aperture 654 of mirror 650 and strikes the concave reflecting surface of mirror 652 and is then reflected by the latter onto the concave mirrored surface of mirror 650. The latter focuses the light through aperture 656 of mirror 652 at the focal point 658 which is located at one end of passage 526 of the flow cell.

It is to be noted that the light passes through a cylindrical member 659 that is mounted on the end of sleeve 646. Member 659 is hollow and carries a hollow cylindrical open ended movable member 660 which is biased, by compression spring 662, so that its external end 664 is resiliently held against the front surface 666 of plate 600, in light-tight relation therewith. In this manner no external light is transmitted to the flow cell and only light from source 170 can enter the flow cell. The pressure of spring 662 is such as to permit surface 666 to slide with respect to end 664 of member 660 so as not to interfere with the transverse movement of the carriage.

The sample photoelectric cell 174 is mounted in position to receive light from the flow cell. For this purpose, the photoelectric cell is mounted in a stationary housing 668 that is suitably supported on base 442 and the housing carries an open ended hollow cylindrical member 660' which is spring biased, as by compression spring 662', so that its end 664' is in sliding light-tight engagement with the rear surface 670 of plate 546 to prevent any external light from reaching the photoelectric cell.

The reference photoelectric cell 172 is suitably mounted in a housing 672 containing suitable lenses and which has provision for holding necessary filters. The housing is suitably mounted on base plate 442 in position so that the reference photoelectric cell 172 receives light from light source 170 simultaneously with receipt of the light by sample photoelectric cell 174. The colorimeter is mounted in a housing (not shown) which shuts out any extraneous light.

The provision for transmitting liquid to and from the different flow cells will now be described in detail. Plate 546 has an upper part to which is secured, by screws 674, a longitudinally extending plate 676, spaced from plate 546 by spacers 678. Plate 676 carries a series of longitudinally spaced nipples 680, one for each flow cell, and a similar number of companion debubblers 76 which have been referred to previously. A tubular passage 682 is secured to plate 676 and extends longitudinally thereof and has an outlet opening 684 (FIG. 13). A series of longitudinally spaced inlet tubes 686 are in fluid flow communication with passage 682 and it will be understood that an inlet tube is provided for each flow cell. Nipples 680 provide individual drains from each flow cell and is used where it is desired to separately collect the examined liquid. When it is not desired or necessary to collect the examined liquid, it can be discharged from the colorimeter through passage 682 which provides a common drain.

The treated segmented stream enters the colorimeter but first passes into the horizontal arm 688 of the debubbler which removes the segmentizing air from the treated stream through upper vertical arm 690, so that a consolidated liquid stream flows down the lower vertical arm 692 and through a tube 694 (shown in dotted lines) to the inlet tube 524 of the flow cell. It will be understood that, as described in the U.S. Patent No. 3,109,714, filed July 22, 1959, and issued November 5, 1963, an aspirating tube 695 is connected to arm 690 for removing the segmentizing air and the tube may be connected to a suction pump tube (not shown) provided in proportioning pump 24. The examined liquid leaves the flow cell through outlet tube 528 and flows to either nipple 680, via tube 696 (shown in dotted lines) when it is desired to collect the examined liquid, or to the inlet tube 686 of the common drain passage 682, via tube 698 (shown in dotted lines) when it is not desired to collect the treated liquid.

The upper part of plate 676 is provided with a series of longitudinally spaced slots 700 (FIG. 13) corresponding in number to the number of debubblers provided. Each slot is provided with a circular tube holding part 702 for resiliently and releasably holding the debubbler by its horizontal tubular arm 688, and the side arms 704 which form slots 700 can flex slightly to resiliently engage the debubblers.

The previously mentioned rack 302 for operating selector switch 176 is secured to the undersurface of lower bar 436 of carriage 178 and is in mesh with the previously mentioned gear 304. The gear is mounted on rotary shaft 308 of the selector switch, as previously indicated, which extends from housing 706 (FIG. 14) of the switch. The switch housing is secured to a plate 708 which is suspended from base plate 442 by screws 710 and spacers 712, adjacent the path of movement of the carriage.

The previously mentioned switches 202 and 204 (FIG. 6) are secured to base plate 442 at opposite ends, respectively, of the path of travel of the carriage in position for actuation by the adjacent opposite ends 284 and 298, respectively, of the carriage.

It is to be understood that while colorimeter 82 has been described having a movable carriage carrying flow cells past a stationary light source and a stationary sample photoelectric cell, it is within the scope of the invention to provide a movable carriage carrying a light source and sample and reference photoelectric cells past stationary flow cells.

While the invention has been described with respect to the treatment and examination of a series of fluid samples, in succession, it is also within the scope of the invention to examine or monitor a stream of fluid continuously with respect to a plurality of substances therein so that the quantities of the substances may be readily determined and recorded on a chart of a recorder. In the case of monitoring, supply device 10 is not employed and a portion of the stream which is being monitored is transmitted, as a stream directly to conduit 12. Continuous operation of the apparatus according to the previously indicated timing results in the production of a record every three minutes whereby not only are the quantities of the substances in the stream readily determined but the change of the quantities, if any, are also being continuously indicated every three minutes.

Obviously, the exemplary examples of timing, type and number of substances in the fluid samples, number of samples examined per hour, etc., are for illustrative purposes only so that the invention can be more easily understood and are not to be considered as limiting the scope of the invention. The particular chemical treatment involved for the different streams with respect to a particular substance are well known and do not, per se, form part of the present invention. On the contrary, the present invention is not directed to any particular chemicals or chemical analyses involving particular chemicals but is concerned with the treatment of fluids in a manipulative sense, so that the quantities of a plurality of substances in a fluid can be expeditiously determined automatically and without the use of large quantities of the fluid so that, as provided by the present invention, determinations of eight constituents of a blood sample can be readily made with a sample of the blood as small as 2.0 ml.

Furthermore, while the invention has been described with the use of a recorder and chart paper to provide direct readings of concentrations, it is within the scope of the invention to provide a recorder and chart paper therefor wherein the results are recorded as light transmissions, in the case of colorimetry, or spectral-emissivity, in the case of spectral-flame analysis. In such a case, it is necessary to convert such values into concentration values by the use of standardization curves in a well known manner. Obviously, direct reading curves of concentrations are to be preferred because of their accuracy and saving of time.

In certain of the appended claims the term dividing-treating-analysis means includes the conduit structure downstream of the off-take tube 19 inclusive of the conduit 12 through to the flow cells 80 and the burner 60. In others of the appended claims the term dividing means includes the dialyzer 36, and the conduits 86, 96, 114, 126 and 146; the term treating-analysis means includes the conduit structure downstream of those conduits including the flow cells **80*a*, 80*b*, 80*c*, 80*d* and 80*e***.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing-treating-analysis means coupled to said supply means for receiving the initial stream of sequential samples, for dividing such initial stream into a plurality of quotient streams, each sequential increment in each of such quotient streams being a fractional portion of a respective sequential sample in the initial stream, for treating the streams for analysis, and for discharging the quotient streams;

said dividing-treating-analysis means including a signal generating means for providing a plurality of output signals, which signals are equal in number to said given number, each such signal varying in response to a selected characteristic of a treated respective fractional portion and thereby indicating the concentration of a respective one of the substances in a sample passing through said dividing-treating-analysis means;

and receiving means coupled to said signal generating means for receiving said signals therefrom, for storing in correlation each signal which is provided responsive to a fractional portion from the same sample from the initial stream;

said signal generating means and said signal receiving means each operating cyclically with respect to each sample from the initial stream.

2. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing-treating-analysis means coupled to said supply means for receiving the initial stream of sequential samples, for dividing such initial stream into a plurality of quotient streams, each sequential increment in each of such quotient streams being a fractional portion of a respective sequential sample in the initial stream, for treating the streams for analysis, and for discharging the quotient streams;

said dividing-treating-analysis means including a signal generating means for sequentially and cyclically providing a plurality of output signals, which signals are equal in number to said given number, each such signal varying in response to a selected characteristic of a treated respective fractional portion and thereby indicating the concentration of a respective one of the substances in a sample passing through said dividing-treating-analysis means;

and receiving means coupled to said signal generating means for receiving said signals therefrom, for storing in correlation each signal which is provided responsive to a fractional portion from the same sample from the initial stream;

said signal generating means and said signal receiving means each operating cyclically with respect to each sample from the initial stream.

3. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing-treating-analysis means coupled to said supply means for receiving the initial stream of sequential samples, for dividing such initial stream into a plurality of quotient streams, the number of quotient streams being equal to said given number, each sequential increment in each of such quotient streams being a fractional portion of a respective sequential sample in the initial stream, for treating the streams for analysis, and for discharging the quotient streams;

said dividing-treating-analysis means including a signal generating means for providing a plurality of output signals, the number of said signals being equal to said given number, each such signal varying in response to a selected characteristic of a treated respective sequential increment and thereby indicating the concentration of a respective one of the substances in such sequential increment passing through said dividing-treating-analysis means;

and receiving means coupled to said signal generating means for receiving said signals therefrom, for storing in correlation each signal which is provided responsive to a fractional portion from the same sample from the initial stream;

said signal generating means and said signal receiving means each operating cyclically with respect to each sample from the initial stream.

4. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing means coupled to said supply means for receiving the initial stream of sequential samples and for dividing such initial stream into a plurality, equal to the given number of substances, of quotient streams, each sequential increment in each of said quotient streams being a fractional portion of a respective sequential sample in the initial stream;

a plurality of treating-analysis means, equal to the given number, each for receiving and for discharging one of the quotient streams;

a plurality of coupling means, equal to the given number, each coupled to said dividing means and to a respective one of said treating means, each for receiving a respective one of the quotient streams from said treating means, and for conveying such quotient stream to said respective treating-analysis means;

signal generating means coupled to said plurality of treating-analysis means for providing a plurality of output signals, equal to the given number, each such signal varying in response to a selected characteristic of the sample in the respective treating analysis means and indicating the concentration of one of the substances in a respective quotient stream passing through a respective treating-analysis means;

and receiving means coupled to said signal generating means for receiving said signals therefrom for storing in correlation each signal which is provided responsive to a respective increment in each quotient stream, and which increment is a fractional portion of the sample from the initial stream;

said signal generating means and said signal receiving means operating cyclically with respect to each sample from the initial stream.

5. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing-treating-analysis means coupled to said supply means for receiving the initial stream of sequential samples, for dividing from such initial stream a plurality of quotient streams, each sequential increment in each of such quotient streams being a fractional portion of a respective sequential sample in the initial stream, for treating the streams for analysis, and for discharging the quotient streams;

said dividing-treating-analysis means including a signal generating means for sequentially and cyclically providing a plurality of output signals, which signals are equal in number to said given number, each such signal being responsive to a selected characteristic of a treated respective fractional portion and thereby indicating the concentration of a respective one of the substances in a sample passing through said dividing-treating-analysis means;

and receiving means coupled to said signal generating means for receiving said signals therefrom, for recording in correlation on a single document each signal which is provided varying in response to a fractional portion from the same sample from the initial stream;

said signal generating means and said signal receiving means each operating cyclically with respect to each sample from the initial stream.

6. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing-treating-analysis means coupled to said supply means for receiving the initial stream of sequential samples, for dividing such initial stream into a plurality of quotient streams, the number of quotient streams being equal to said given number, each sequential increment in each of such quotient streams being a fractional portion of a respective sequential sample in the initial stream, for treating the streams for analysis, and for discharging the quotient streams;

said dividing-treating-analysis means including a signal generating means for providing a plurality of output signals, the number of said signals being equal to said given number, each such signal being responsive to a selected characteristic of a treated respective sequential increment and thereby indicating the concentration of a respective one of the substances in such sequential increment passing through said dividing-treating-analysis means;

and recording means, coupled to said signal generating means for receiving said signals therefrom, having a single stylus and means for moving said stylus in response to each signal which is provided in response to a fractional portion from the same sample from the initial stream;

said signal generating means and said recording means each operating cyclically with respect to each sample from the initial stream.

7. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing means coupled to said supply means for receiving the initial stream of sequential samples and for dividing such initial stream into a plurality, equal to the given number of substances, of quotient streams, each sequential increment in each of such quotient streams being a frictional portion of a respective sequential sample in the initial stream;

a plurality of treating-analysis means, equal to the given number, each for receiving and for discharging one of the quotient streams;

a plurality of coupling means, equal to the given number, each coupled to said dividing means and to a respective one of said treating means, each for receiving a respective one of the quotient streams from said treating means, and for conveying such quotient stream to said respective treating-analysis means;

signal generating means coupled to said plurality of treating-analysis means for providing a plurality of output signals, equal to the given number, each such signal varying in response to a selected characteristic of the sample in the respective treating-analysis means and indicating the concentration of one of the substances in a respective quotient stream passing through a respective treating-analysis means;

and receiving means coupled to said signal generating means for receiving said signals therefrom for storing in correlation each signal which is provided responsive to a respective increment in each quotient stream, and which increment is a fractional portion of the sample from the initial stream;

said signal generating means and said signal receiving means operating cyclically with respect to each sample from the initial stream.

8. Apparatus for the analysis of a plurality of fluid samples with respect to a given number of different substances present in the fluid, said apparatus comprising:

supply means for providing the samples sequentially to form an initial stream of sequential samples wherein each sample is in sequence with the preceding and succeeding samples;

dividing means coupled to said supply means for receiving the initial stream of sequential samples and for dividing such initial stream into a plurality, equal to the given number of substances, of quotient streams, each sequential increment in each of such quotient streams being a fractional portion of a respective sequential sample in the initial stream;

a plurality of treating-analysis means, equal to the given number, each for receiving and for discharging one of the quotient streams;

a plurality of coupling means, equal to the given number, each coupled to said dividing means and to a respective one of said treating means, each for receiving a respective one of the quotient streams from said treating means, and for conveying such quotient stream to said respective treating-analysis means;

signal generating means coupled to said plurality of treating-analysis means for sequentially providing a plurality of output signals, equal to the given number, each such signal varying in response to a selected characteristic of the sample in the respective treating-analysis means and indicating the concentration of one of the substances in a respective quotient stream passing through a respective treating-analysis means;

and recording means coupled to said signal generating means for sequentially receiving said signals therefrom, having a chart and a stylus coupled to a movable tap on a potentiometer in a comparison null-type balancing circuit, for recording in correlation each signal which is provided in response to a respective increment in each quotient stream, and which increment is a fractional portion of the sample from the initial stream, and also having means for inverting certain of said signals to said potentiometer and its circuit to move said tap and stylus in a direction which is opposite to their normal movement; said signal generating means and said recording means operating cyclically with respect to each sample from the initial stream.

9. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into a plurality of quotient streams, each sequential increment in each of said quotient streams being a fractional portion of a respective sequential sample in said initial stream;

continuously treating said streams for analysis;

analyzing each of said quotient streams for the concentration of at least a respective one of said different substances in each respective increment;

providing and storing a signal varying in response to each analysis, the respective increments of the respective quotient streams which are fractional portions of the same sample from said initial stream being analyzed in the same cycle and their respective signals being stored in correlation.

10. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into a plurality of quotient streams, each sequential increment in each of said quotient streams being a fractional portion of a respective sequential sample in said initial stream;

continuously treating said quotient streams for analysis;

sequentially analyzing each of said quotient streams for the concentration of at least a respective one of said different substances in each respective increment;

providing and storing a signal varying in response to each analysis, the respective increments of the respective quotient streams which are fractional portions of the same sample from said initial stream being analyzed in the same cycle and their respective signals being stored in correlation.

11. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into a plurality of quotient streams, each sequential increment in each of said quotient streams being a frictional portion of a respective sequential sample in said initial stream;

continuously treating said quotient streams for analysis;

analyzing each of said quotient streams for the concentration of at least a respective one of said different substances in each respective increment;

sequentially providing and storing a signal varying in response to each analysis, the respective increments of the respective quotient streams which are fractional portions of the same sample from said initial stream being analyzed in the same cycle and their respective signals being stored in correlation.

12. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into a plurality, equal to said given number of substances, of quotient streams, each sequential increment in each of said quotient streams being a fractional portion of a respective sequential sample in said initial stream;

treating each of said quotient streams for analysis for a respective one of the substances;

analyzing each of said quotient streams for the concentration of the respective one of the substances in each respective increment;

providing and recording a signal varying in response to each analysis, the respective increments of the respective quotient streams which are fractional portions of the same sample from said initial stream being analyzed in the same cycle and their respective signals being recorded in correlation.

13. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into plurality, equal to said given number of substances, of quotient streams, each sequential increment in each of said quotient streams being a fractional portion of a respective sequential sample in said initial stream;

continuously treating each of said quotient streams for analysis for a respective one of the substances;

sequentially analyzing each of said quotient streams for the concentration of the respective one of the substances in each respective increment;

providing and storing a signal varying in response to each analysis, the respective increments of the respective quotient streams which are fractional portions of the same sample from said initial stream being analyzed in the same cycle and their respective signals being stored in correlation.

14. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing said initial stream into a plurality of quotient streams, each sequential increment in each of said quotient streams being a fractional portion of a respective sequential sample in said initial stream;

continuously treating at least some of said streams for analysis;

analyzing each of said treated quotient streams for the concentration of at least a respective one of said different substances in each respective increment;

providing and storing a signal varying in response to each analysis, the respective increments of the respective quotient streams which are fractional portions of the same sample from said initial stream being analyzed in the same cycle and their respective signals being recorded in correlation on the same document.

15. A method of analysis of a plurality of fluid samples with respect to a given number of different substances present in each fluid sample, said method comprising:

sequentially transmitting said samples to form an initial stream of sequential samples wherein each sample is in sequence with the preceding and succeeding samples;

continuously dividing from said initial stream a plurality, equal to said given number of substances, of quotient streams, each sequential increment in each of said quotient streams being a fractional portion of a respective sequential sample in said initial stream;

treating each of said quotient streams for analysis for a respective one of the substances;

analyzing each of said quotient streams for the concentration of the respective one of the substances in each respective increment;

providing and recording a signal varying in response to each analysis, the respective increments of the respective quotient streams which are fractional portions of the same sample from said initial stream being analyzed in the same cycle and their respective signals being recorded in correlation on the same document.

16. A method of analysis of a plurality of fluid samples with respect to a given number of different substances present in each fluid sample, said method comprising:

sequentially transmiting said samples to form an initial stream of sequential samples wherein each sample is in sequence with the preceding and succeeding samples;

continuously dividing said initial stream into a plurality, equal to said given number of substances, of quotient streams, each sequential increment in each of said quotient streams being a fractional portion of a respective sequential sample in said initial stream;

continuously treating each of said quotient streams for analysis for a respective one of the substances;

sequentially and cyclically analyzing each of said quotient streams for the concentration of the respective one of the substances in each respective increment;

sequentially and cyclically providing and storing a signal varying in response to each analysis, the respective increments of the respective quotient streams which are fractional portions of the same sample from said initial stream being analyzed in the same cycle and their respective signals being stored in correlation.

References Cited by the Examiner

UNITED STATES PATENTS

| | | | |
|---|---|---|---|
| 2,642,536 | 6/1953 | Heigl | 250—218 |
| 2,797,149 | 6/1957 | Skeggs | 23—230 |
| 2,890,617 | 6/1959 | Lupfer et al. | 250—218 |
| 2,982,170 | 5/1961 | Wyss | 88—14 |
| 3,026,764 | 3/1962 | Allen et al. | 88—14 |
| 3,137,759 | 6/1964 | Isreeli | 88—14 |

FOREIGN PATENTS

| | | |
|---|---|---|
| 834,633 | 5/1960 | Great Britain. |

OTHER REFERENCES

Steiner, L. E., and Campbell, J. A.: General Chemistry, Macmillan Co., New York, 1955, pages 375–376.

Technicon article, Flame Photometer, Technicon Instruments Corp., Chauncey, N.Y., November 1959, page 6.

JEWELL H. PEDERSEN, *Primary Examiner.*

O. B. CHEW, *Assistant Examiner.*